United States Patent [19]
Mann

[11] 3,981,008
[45] Sept. 14, 1976

[54] NAVIGATIONAL AND COLLISION AVOIDANCE APPARATUS

[75] Inventor: John Russell Mann, Bedford, Mass.

[73] Assignee: Iotron Corporation, Bedford, Mass.

[22] Filed: Apr. 13, 1972

[21] Appl. No.: 243,646

Related U.S. Application Data

[63] Continuation-in-part of Ser. No. 885,234, Dec. 15, 1969, abandoned.

[52] U.S. Cl. .......................... 343/5 DP; 343/112 CA
[51] Int. Cl.$^2$ .......................... G01S 7/44; G01S 9/02
[58] Field of Search .......... 343/5 DP, 77 A, 112 CA

[56] References Cited
UNITED STATES PATENTS

| | | | |
|---|---|---|---|
| 3,151,322 | 9/1964 | Hildebrandt...................... | 343/5 DP |
| 3,353,177 | 11/1967 | Wilmot............................. | 343/5 DP |
| 3,383,677 | 5/1968 | Baum et al. ...................... | 343/5 ST |
| 3,386,091 | 5/1968 | Wilmot et al..................... | 343/5 DP |
| 3,403,396 | 9/1968 | Van Popta et al................ | 343/5 DP |
| 3,571,479 | 3/1971 | Horattas ........................... | 343/5 DP |

*Primary Examiner*—Malcolm F. Hubler

[57] ABSTRACT

Marine surface radar processing equipment provides digitized target range pulses at a plurality of ranges, and includes target evaluation apparatus that comprises target leading edge signal means providing a target leading edge signal pulse at successive azimuths, and target trailing edge signal means providing a target trailing edge signal pulse at successive azimuths and initially separated in range from the target leading edge signal. The edge signal pulses describe a target envelope. The coincidence in range of a leading edge signal pulse and a trailing edge signal pulse provides a target envelope end recognition signal. The target evaluation apparatus further comprises discriminating means responsive to a maximum number of target leading edge signal pulses at successive azimuth intervals. The maximum number decreases at successively increasing ranges. The discriminating means discriminates between landmass targets of greater than a predetermined actual length in azimuth representing a maximum ship length, and possible ship targets of less than the predetermined actual length in azimuth. The discriminating means provides a discriminated target output signal responsive to possible ship targets of less than the predetermined length for display of ship targets with their speed and course vectors.

10 Claims, 24 Drawing Figures

READ IN TARGET DATA FROM TARGET EVALUATION APPARATUS
PRIORITY LEVEL 9

TARGET ACQUISITION AND TRACKING
PRIORITY LEVEL 4

READ OUT FROM DISPLAY FILES
PRIORITY LEVEL 6

NAVIGATIONAL AND COLLISION AVOIDANCE APPARATUS

This application is a continuation-in-part of my application Ser. No. 885,234 filed Dec. 15, 1969, now abandoned. Its invention relates to navigational and collision avoidance apparatus for use on moving vehicles and more particularly to pulsed apparatus such as radar for use on surface vessels such as ships.

BACKGROUND OF THE INVENTION

The requirements for automatic radar processing and display equipment for shipboard use have not heretofore been successfully met, mostly because of the unique problems posed by the reflection of signals from extended landmasses, and occasionally from waves; these signals tend to dominate and obscure those from the wanted smaller targets, especially other ships, as well as from navigational aids. For example, because of the continuous movement of the ship, the multiple targets produced by landmasses cannot be eliminated by the simple masking techniques that can be used in fixed radar installations, while the large volume of information due to the presence of such landmasses has been considered to make impractical signal processing by computer, which has been used in certain stationary systems for air traffic control, as disclosed, for example, in the *Processing of the Eighth Symposium of the A.G.A.R.D. Avionics Panels*, London, 21–25 September 1964, particularly at pages 525–556, Chapter 28, *Digitalization of Radar Signals and their Evaluation by a Computer for Automatic Tracking of Targets* and Chapter 29, *Evaluation of Track-while-Scan Computer Logics*. See also, U.S. Pat. No. 3,235,867. For these reasons, up to the present time, ship radars have been limited to relatively simple systems whose display is known to be difficult to interpret, especially in time of stress, as when there is danger of collision.

All of these problems are, of course, made more difficult to deal with because of the increasing size of ships, which makes their maneuvering times much greater and greatly extends the distance within which other ships represent a collision danger.

SUMMARY OF THE INVENTION

Accordingly, it is a major object of the present invention to provide novel navigational and collision avoidance radar or the like equipment for shipboard use which solves the above-mentioned problems.

It is another object of the invention to make possible the use of relatively simple, automatic radar processing equipment on a moving ship as an aid to recognizing ship targets for collision avoidance.

It is still another object of the invention to provide for greatly improved target evaluation.

In one aspect of the invention, novel target evaluation apparatus is provided for use with marine surface radar processing equipment providing digitized target range pulses and comprises target leading edge signal means providing a target leading edge signal pulse at successive azimuths and target trailing edge signal means providing a target trailing edge signal pulse at successive azimuths and initially separated in range from said target leading edge signal, the coincidence in range of a leading edge signal pulse and a trailing edge signal pulse providing a target envelope end recognition signal.

In another of its aspects, the present invention deals with the problems caused by the presence of targets such as extended landmasses by discriminating between such targets and smaller targets, such as ships and navigational aids. More specifically, this is accomplished by providing discriminating means preferably responsive to a maximum number of successive azimuthal target leading edge signal pulses, the maximum number decreasing at successively increasing ranges, for discriminating between landmass targets of greater than a predetermined actual length in azimuth representing a maximum ship length and targets of less than a predetermined actual length in azimuth representing possible ship targets, thus providing a discriminated target output signal responsive to targets of less than said predetermined length representing possible ship targets. These target output signals, many fewer in number than the total number of echo trains received, represent small targets that may pose collision risks; these signals may be fed to suitable computer means for calculating the speed and course of the targets and preferably to suitable display means for display thereof as well. Preferably said discriminating means also provides a landmass output signal responsive to targets of greater than said predetermined length representing a major portion of the leading edge in azimuth of landmass targets for display thereof in a contrasting manner.

Still further objects and features of the present invention will become apparent in the following detailed description of a preferred embodiment thereof, taken together with the accompanying drawings, wherein.

The designation REG in the boxes shown in the figures means "register".

Figure 1:
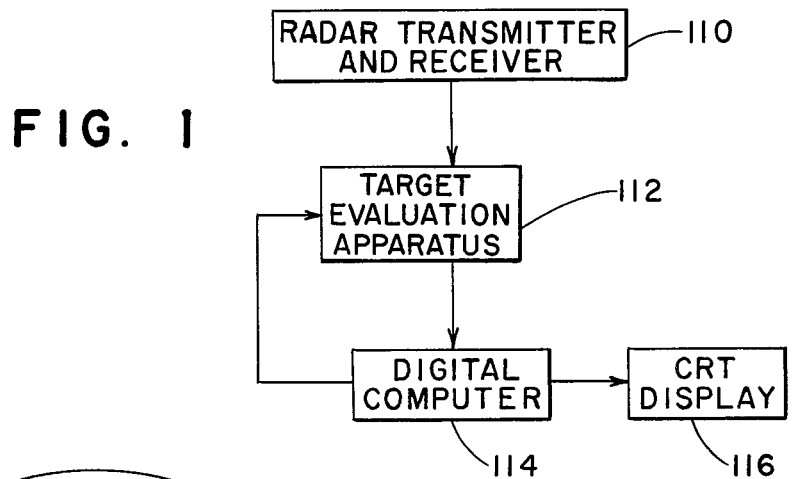
FIG. 1 is a simplified block diagram of the complete automatic radar system.
Figure 2:
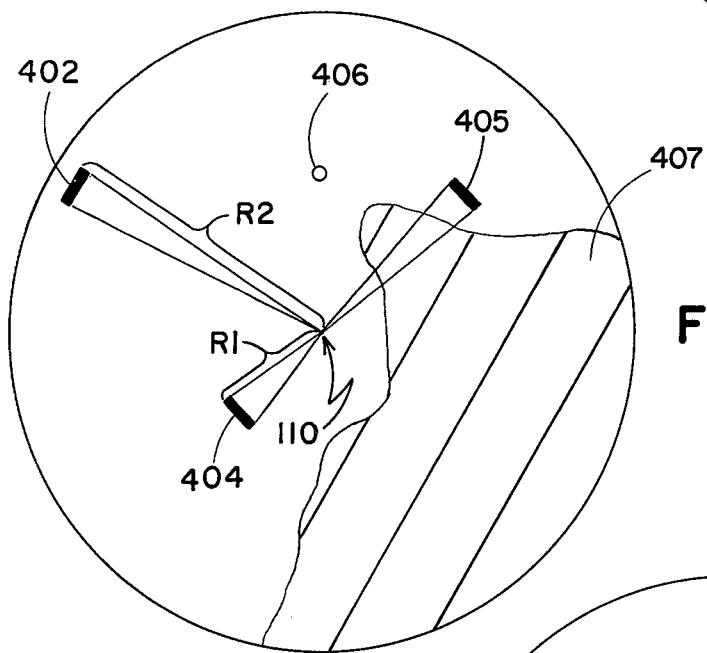
FIG. 2 is an illustrative view of several possible targets and a landmass.

Refer first to FIG. 1, which shows schematically marine surface piloting apparatus according to the invention, in the form of an automatic radar processing system, consisting of a radar transmitter and receiver 110, a target evaluation processing apparatus 112, which is hereafter described in greater detail, a digital computer 114, and a graphic CRT display 116. Radar transmitter and receiver 110, for sensing target range and azimuth, and digital computer 114, which is of the well known general purpose type consisting of an arithmetic unit, a control unit and a memory unit, and CRT display 116 are generally well known to the art and so need not be described in detail herein. FIG. 2 illustrates schematically a landmass and three targets of equal size located at different distances from the radar transmitter.

Generally, according to the present invention, the antenna of radar 110 rotates continuously and sends out pulses at regular intervals. After each pulse, a series of echoes is received, the delay time of each echo being a function of the range at which it was reflected. Each echo train is received from a different azimuthal direction as the antenna rotates. The transmitted pulse and received echoes are digitized (to be either 1 or 0) and are then processed by target evaluation processor 112 to derive digitized data representing the range of the target, its width, and a discrimination decision as to whether the target is interpreted as a landmass or a ship. This information is provided to computer 114, which operates on the data according to stored programs, and eventually presents the information for visual display on CRT 116.

Figure 5:
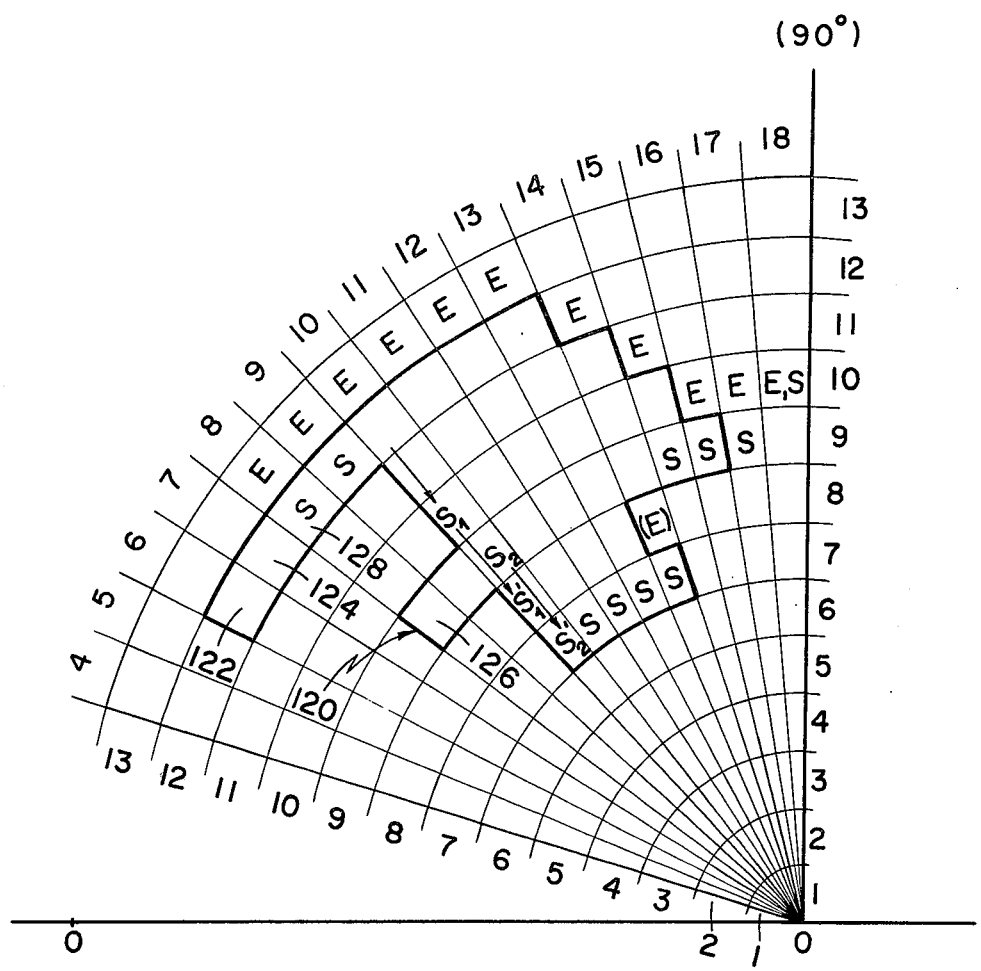
FIG. 5 is a schematic view of a target envelope.

For purposes of illustration only, as shown in FIG. 5 it is assumed that a radar pulse is sent out once every 5° during the rotation of the antenna. Thus, the area that is observed by radar is considered to be divided into azimuth sectors that are 5° wide. Echoes of each pulse are returned from targets at various ranges, the ranges being divided, by the processing apparatus of the invention into successive target rings. The unit of space from which a single echo is returned is herein defined as a target box; thus a sequence of target boxes extending in range forms an azimuth sector, and a sequence of target boxes extending in azimuth forms a range ring. A region containing 13 range rings and 18 azimuth sectors is shown in FIG. 5. When a target is present, a generally contiguous group of target boxes generally extending in both range and azimuth is defined as a target envelope, such as envelope 120 in FIG. 5.

It will thus be seen in FIG. 5 that, after each transmitted pulse up to azimuth sector 5, no echoes are received. After the sixth pulse, an echo 122 is received from the 12th range ring; for the seventh pulse, an echo 124 is received from the same range; for the eighth pulse, an echo 126 is received from the ninth range ring and echo 128 from the 12 range ring, with two gaps in between, and so on.

FIG. 5 shows a digitized representation of a typical target envelope 120, as represented by digitized echoes received from the target. Such an echo envelope often does not form a pattern that corresponds clearly with the shape of the target itself, but may instead have an irregular shape with indentations in its outline, and even apparent holes from which no echo is received. It is desired ultimately to represent the target in a simple form on the display, at a single representative range and azimuth, deriving these values from information like that shown in FIG. 5. It is also desired, as echoes are received at each increment of azimuth, to be able to determine whether the echoes represent no target (that is, noise or clutter), a target previously identified, a new target, or a landmass, and to determine whether echoes separated by gaps in range or azimuth should be interpreted as coming from single or multiple targets. All these aims are achieved through the use of the present invention.

OUTLINE

Figure 6:
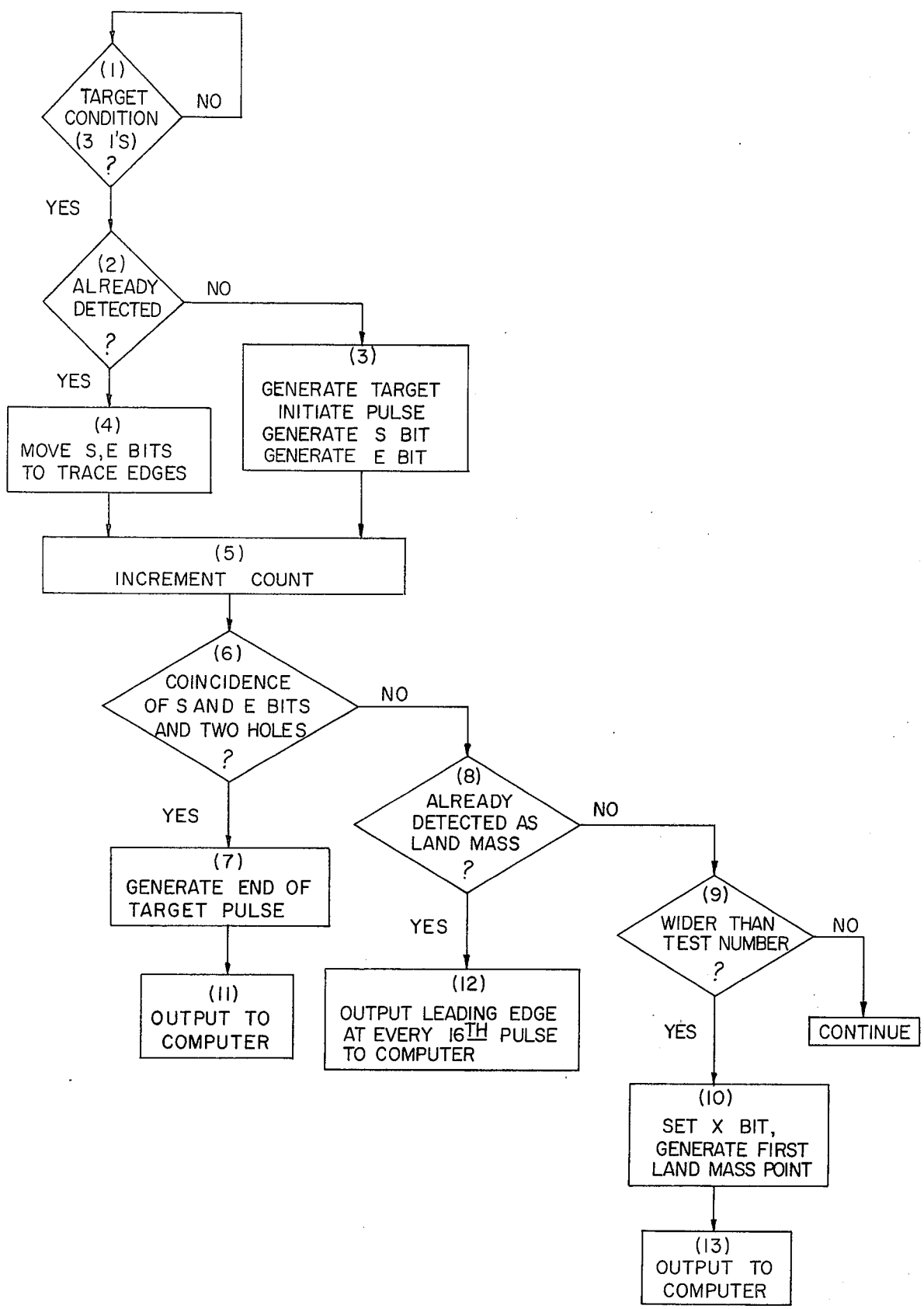
FIG. 6 is a list of the logic steps performed by the target evaluating apparatus of the invention.

In brief outline, according to the invention and referring to FIG. 6, which illustrates this outline, a new target is considered to be detected when echoes are received from three contiguous target boxes in a single range ring, such as the echoes 122, 124 and 128 received from target boxes formed by azimuth sectors 6, 7 and 8 in the twelfth range ring in FIG. 5. When this condition is found (step 1), portions of evaluation apparatus 112, by means to be described more fully in what follows, generate a leading edge signal called a Start or S pulse, which is recorded at the range of the three adjacent echoes and the azimuth of the third successive echo. When no echo is received from the next range ring at this same azimuth, a trailing edge signal called and End or E pulse is generated and is recorded at the first empty range box (step 3).

As further echoes are received from successive azimuth sectors, the S and E pulses are propagated by means to be described. The propagation of the S pulse along the leading edge of a target envelope traces the leading edge of the target (step 4). In the 18th azimuth sector, in the example shown in FIG. 5, the S and E pulses are recorded by the target evaluation apparatus, by means of circuitry to be described, as being both in range ring 10, and this coincidence condition is interpreted to indicate that the end of the target envelope has been reached (steps 6 and 7).

Additionally, as the S pulse is propagated to trace the leading edge of the target, a count is kept in apparatus 112 representing the angular width of the target (step 5). This count is compared with a predetermined number, somewhat greater than the angular width of the largest known ship, say 2000 feet, when seen at that range, and the result of the comparison is used to discriminate between possible ship targets (ships or navigational buoys, for example) and landmasses (steps 8 and 9).

Information derived in this way is then provided to computer 114 for processing, to be described in more detail in what follows (steps 11, 12 and 13).

Figure 4:
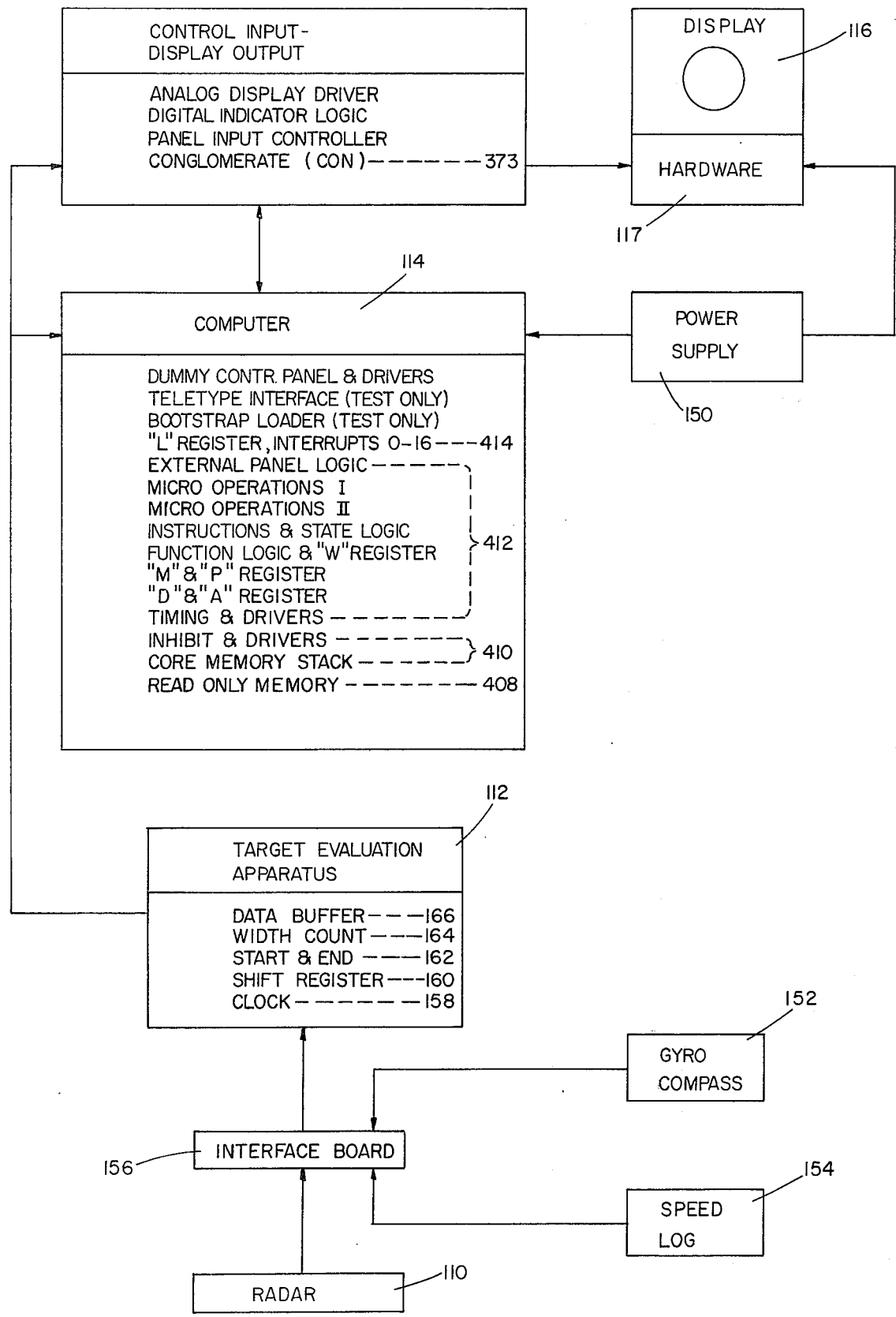
FIG. 4 is a more detailed block diagram of the system.

FIG. 4 is a more detailed block diagram of the elements shown in FIG. 1, preferably with a ship's gyrocompass 152 and speed log 154, which are input to processor 112.

The target evaluation apparatus 112 of the invention is physically composed of a group of eight circuit boards called the front end, of which one is designated the Interface Board 156 and is specifically designed for the type of radar employed, and the remaining seven comprise a standard unit. These boards are specifically a Clock Board 158, three Shift Register Boards 160, a Start and End Board 162, a Width Count Board 164, and a Data Format and Buffer Board 166.

INTERFACE BOARD

Figure 7:
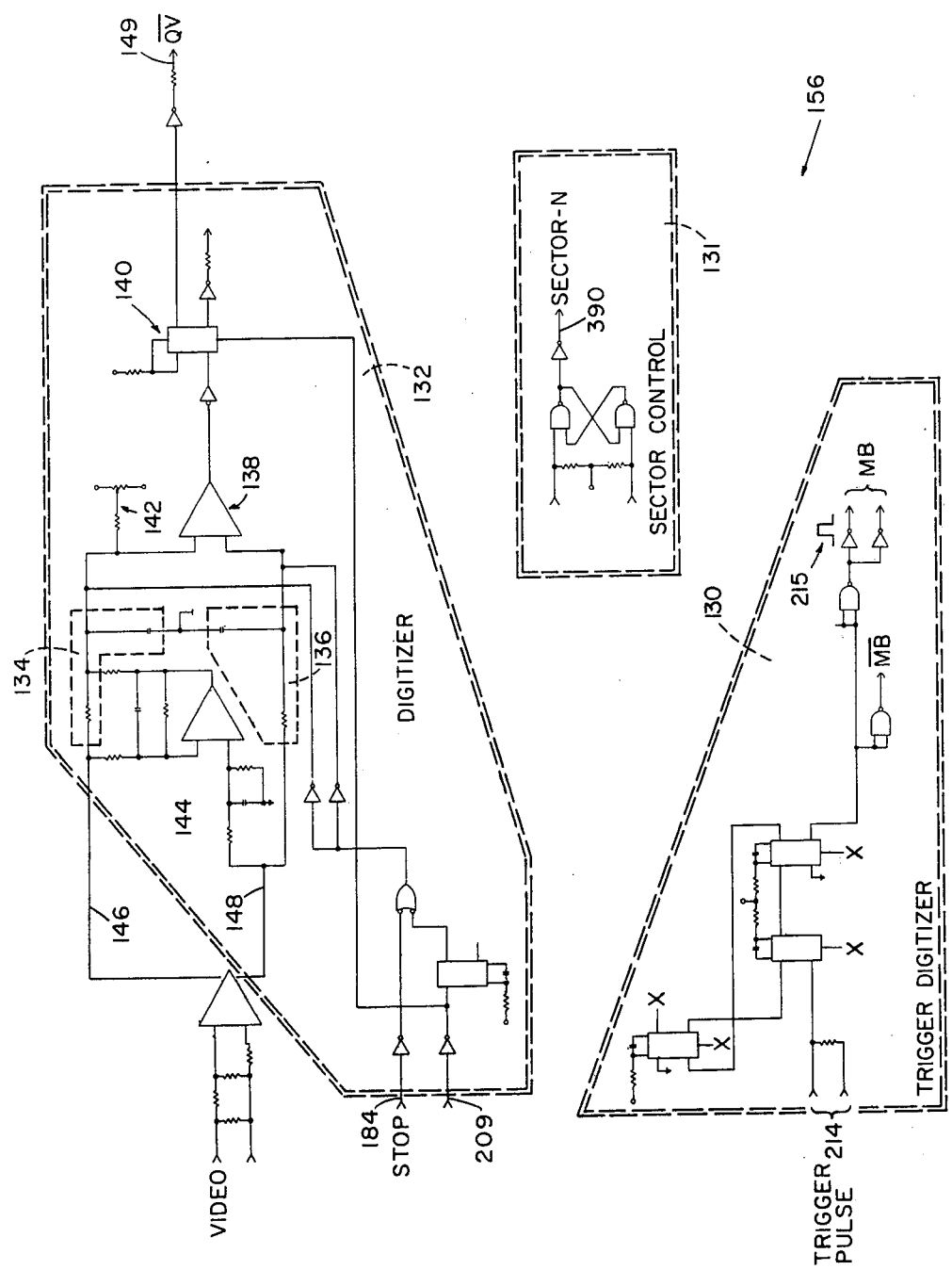
FIGS. 7 through 11D are schematic views of portions of the target evaluating apparatus.
Figure 8A:
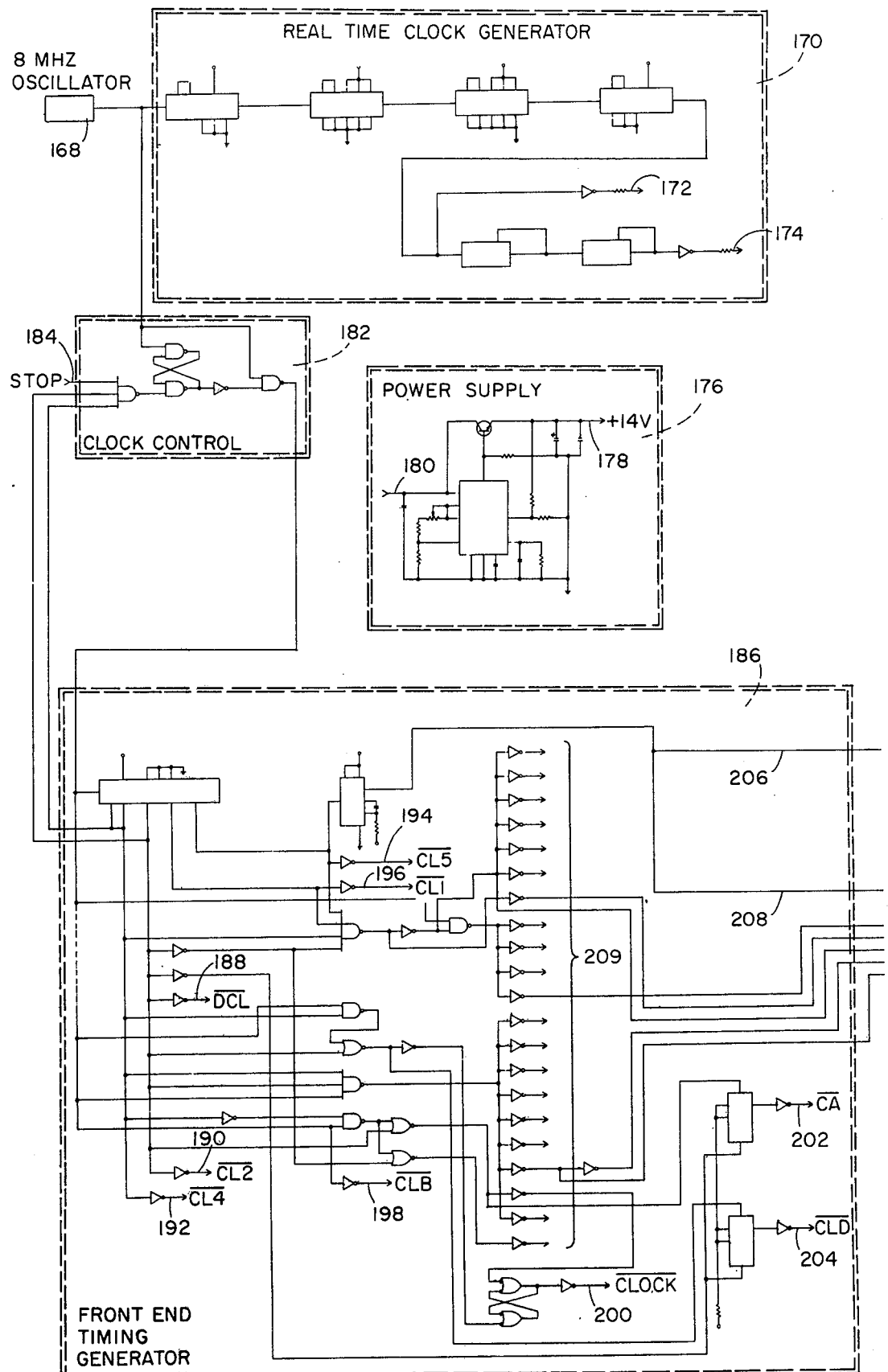
Figure 8B:
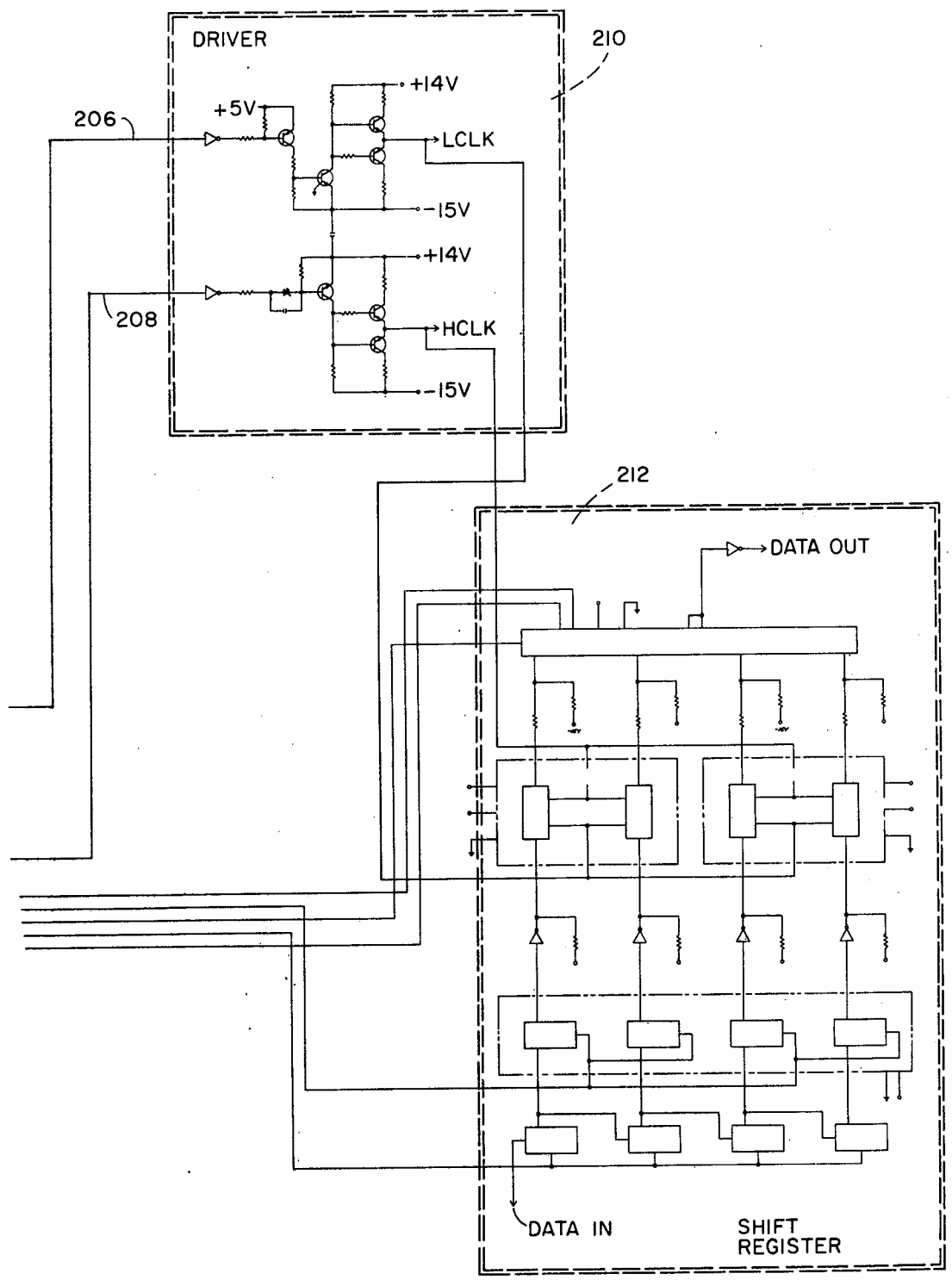
Figure 9A:
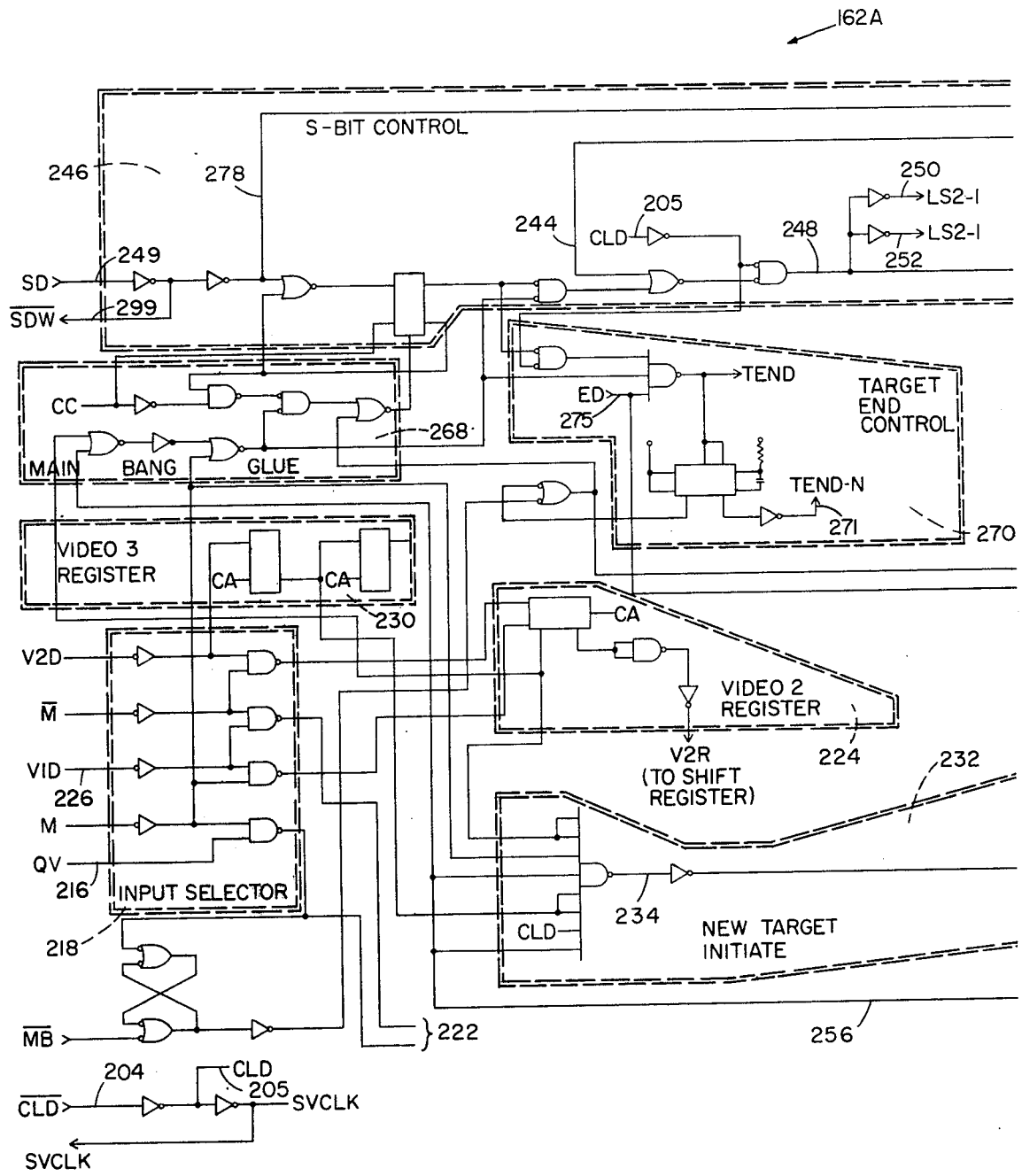
Figure 9A:
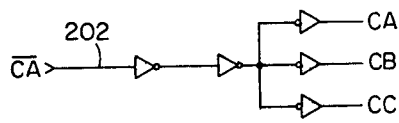
Figure 9B:
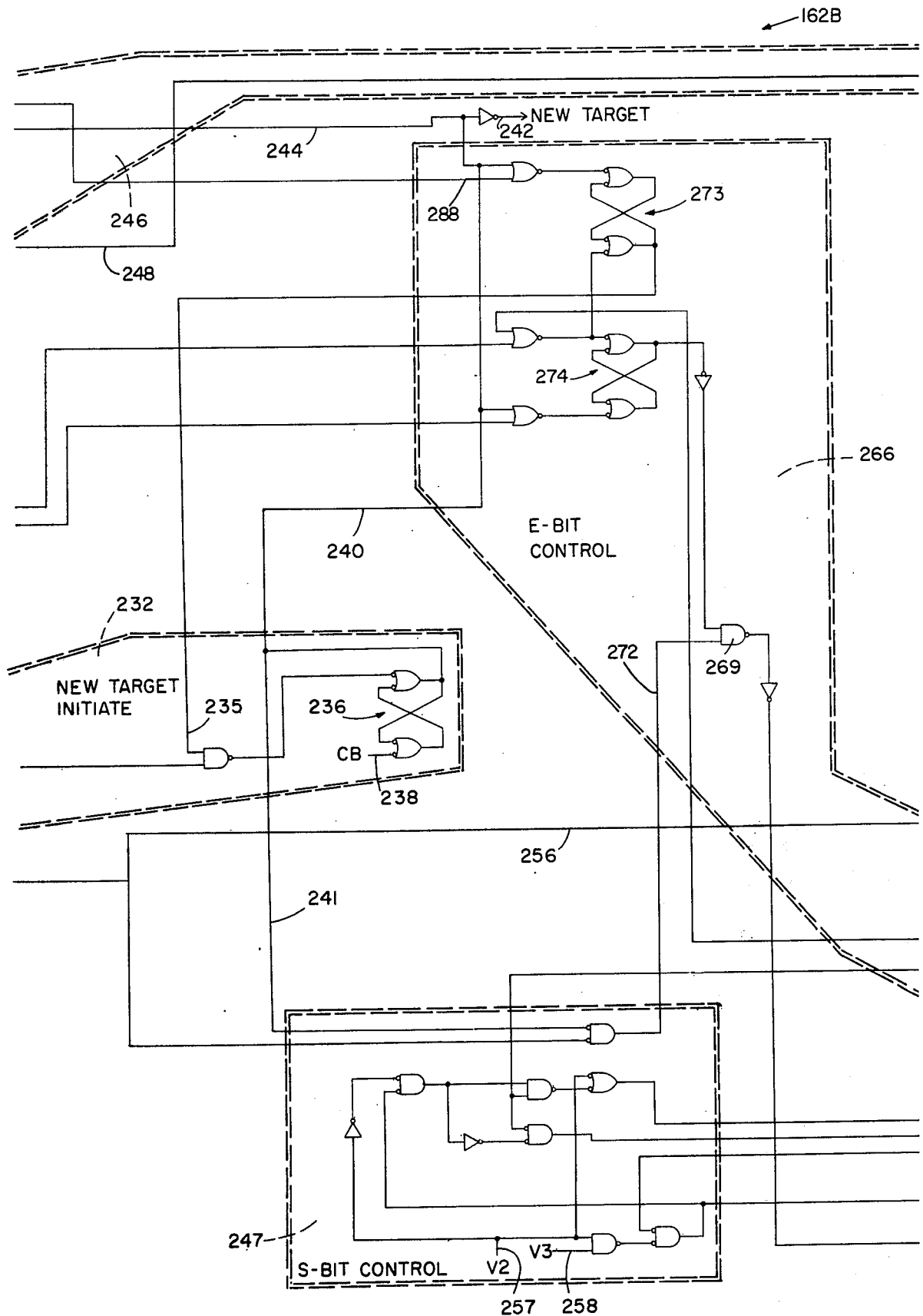
Figure 9C:
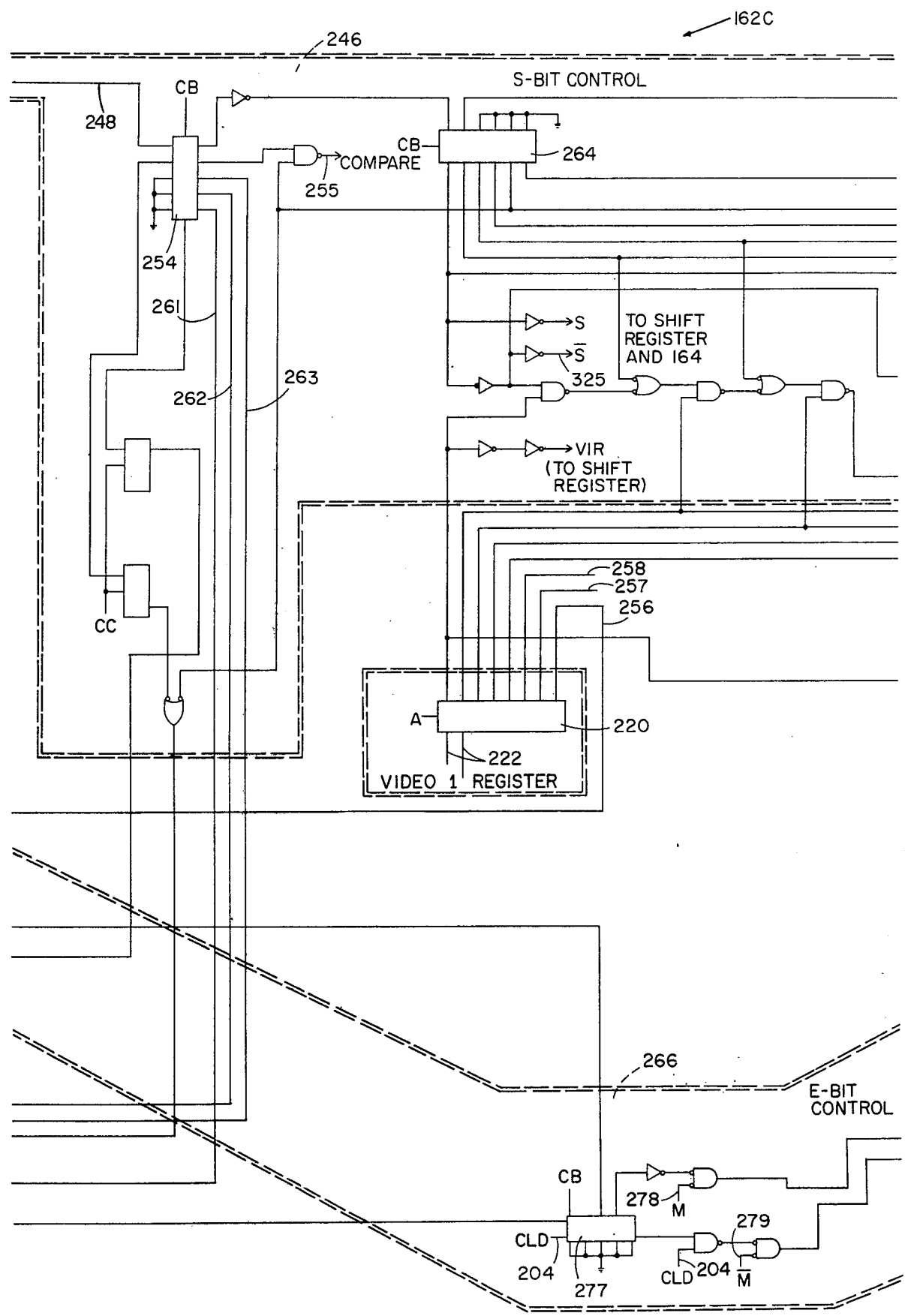
Figure 9D:
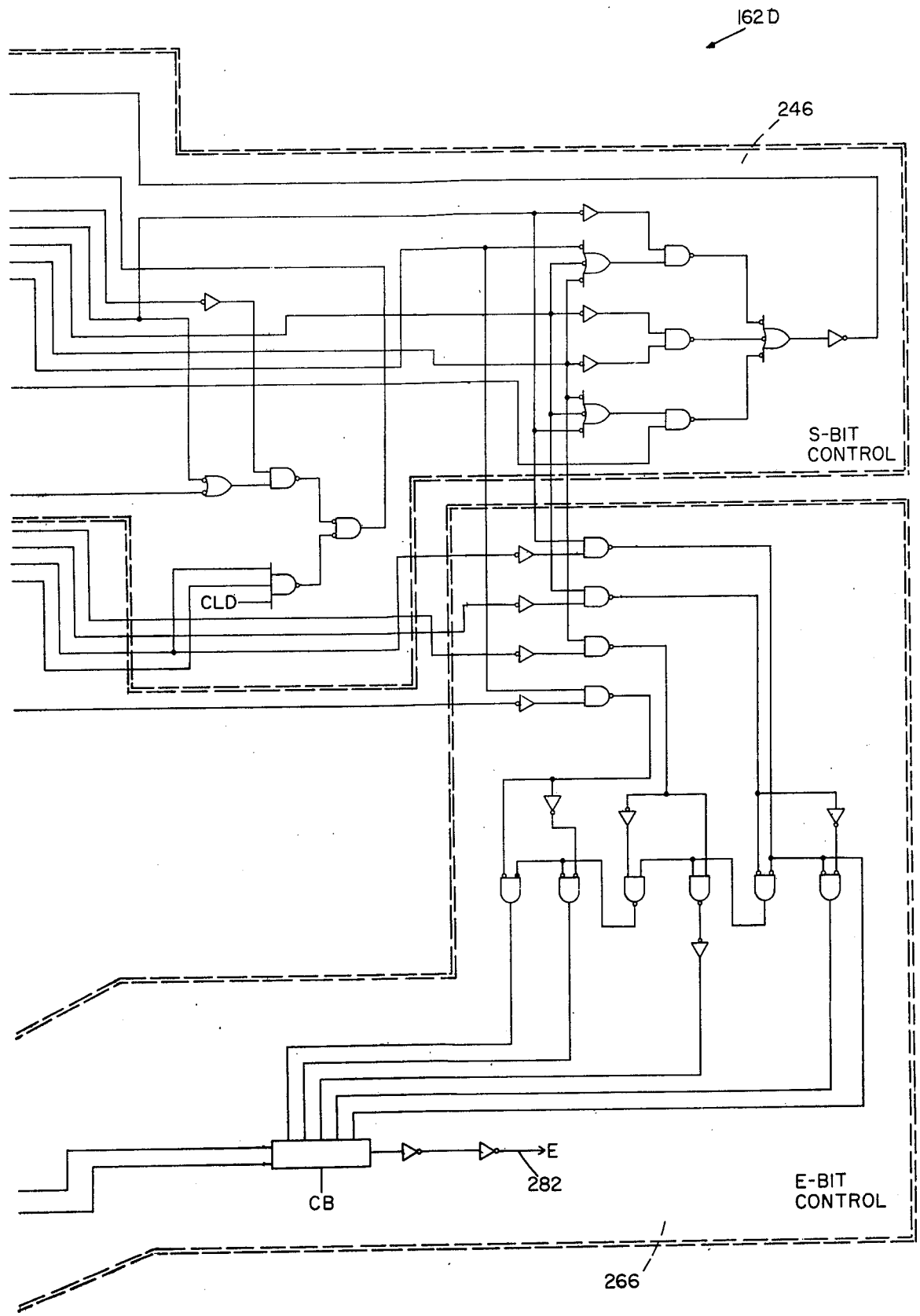
Figure 10A:
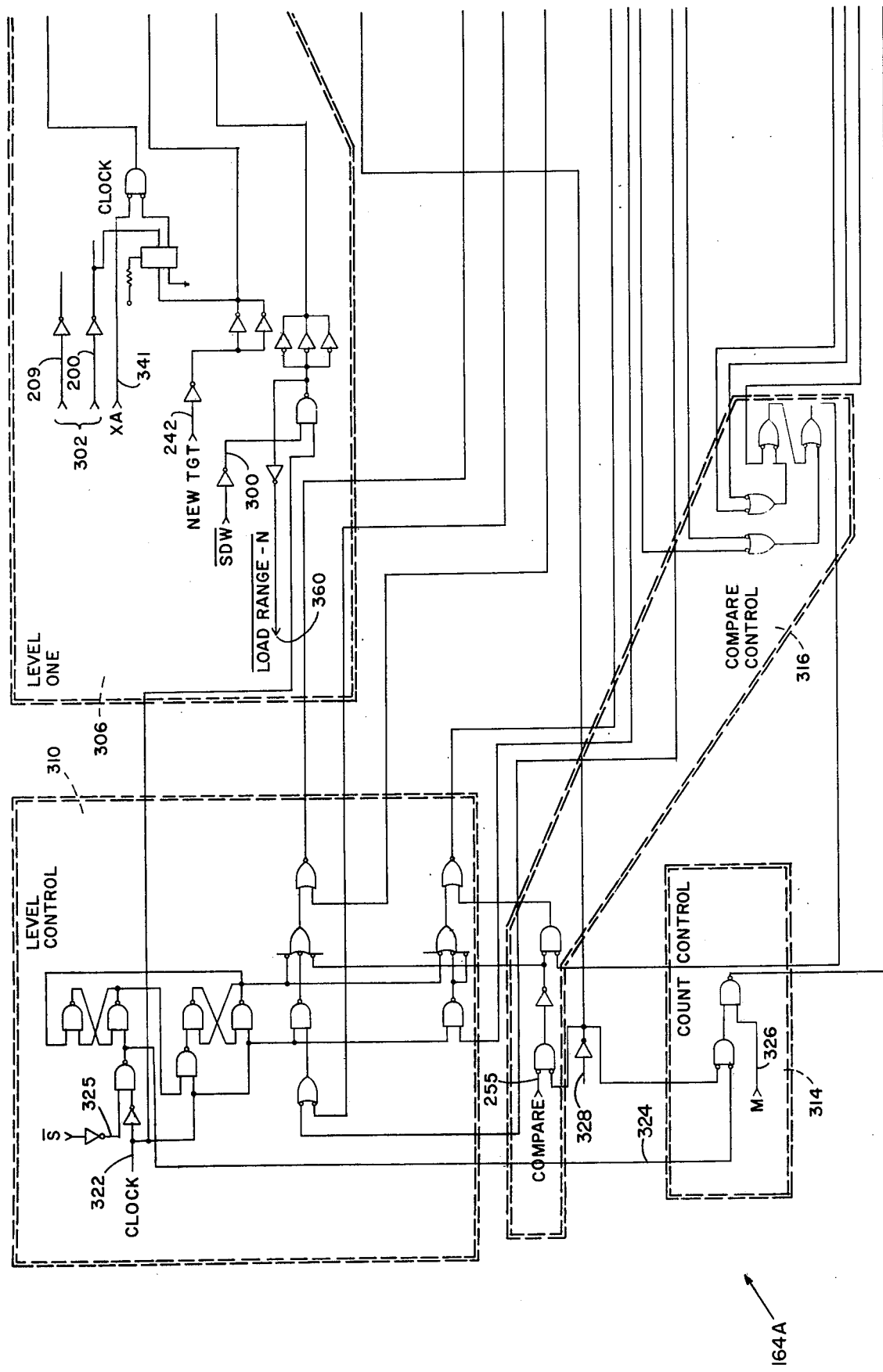
Figure 10B:
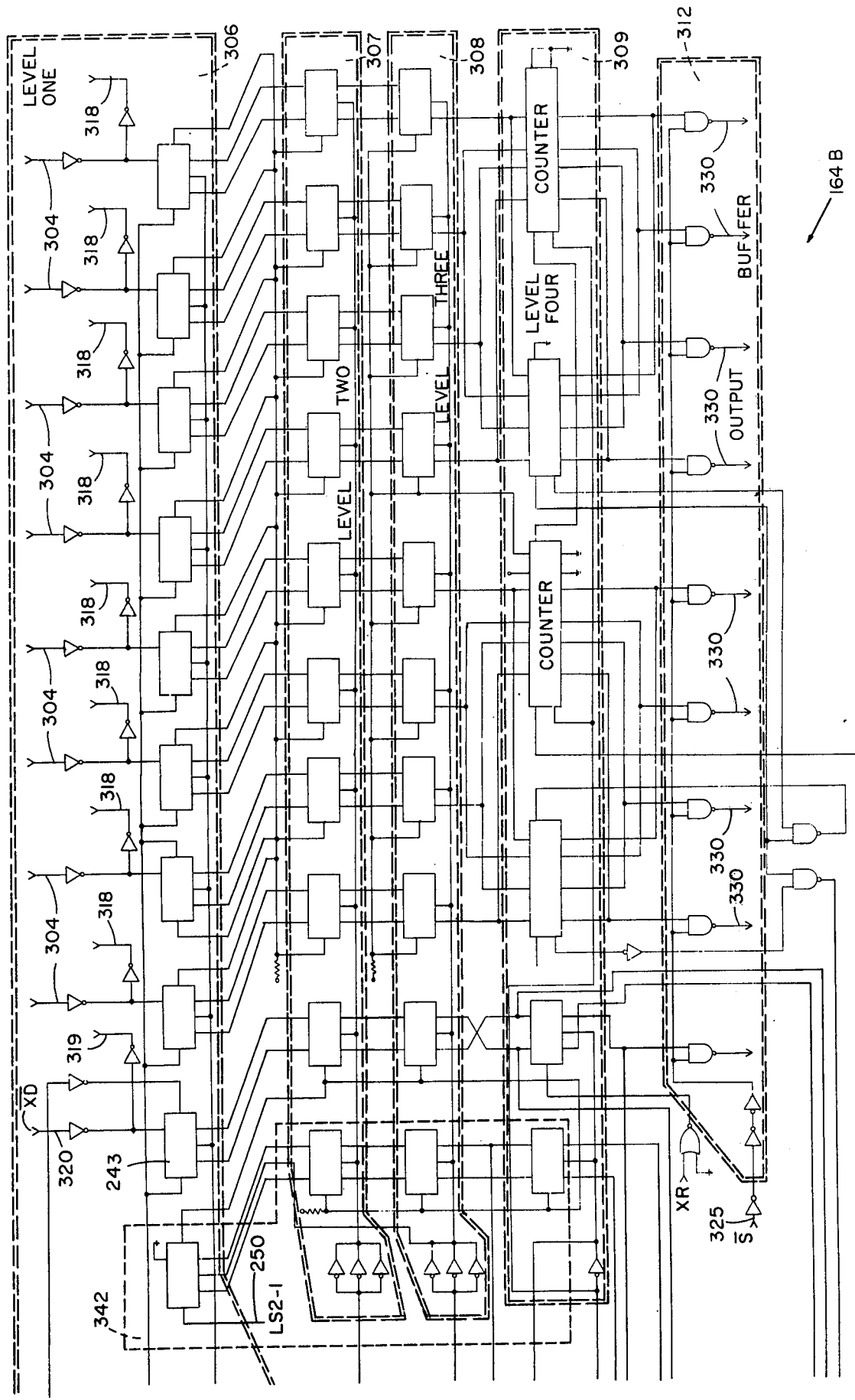
Figure 11A:
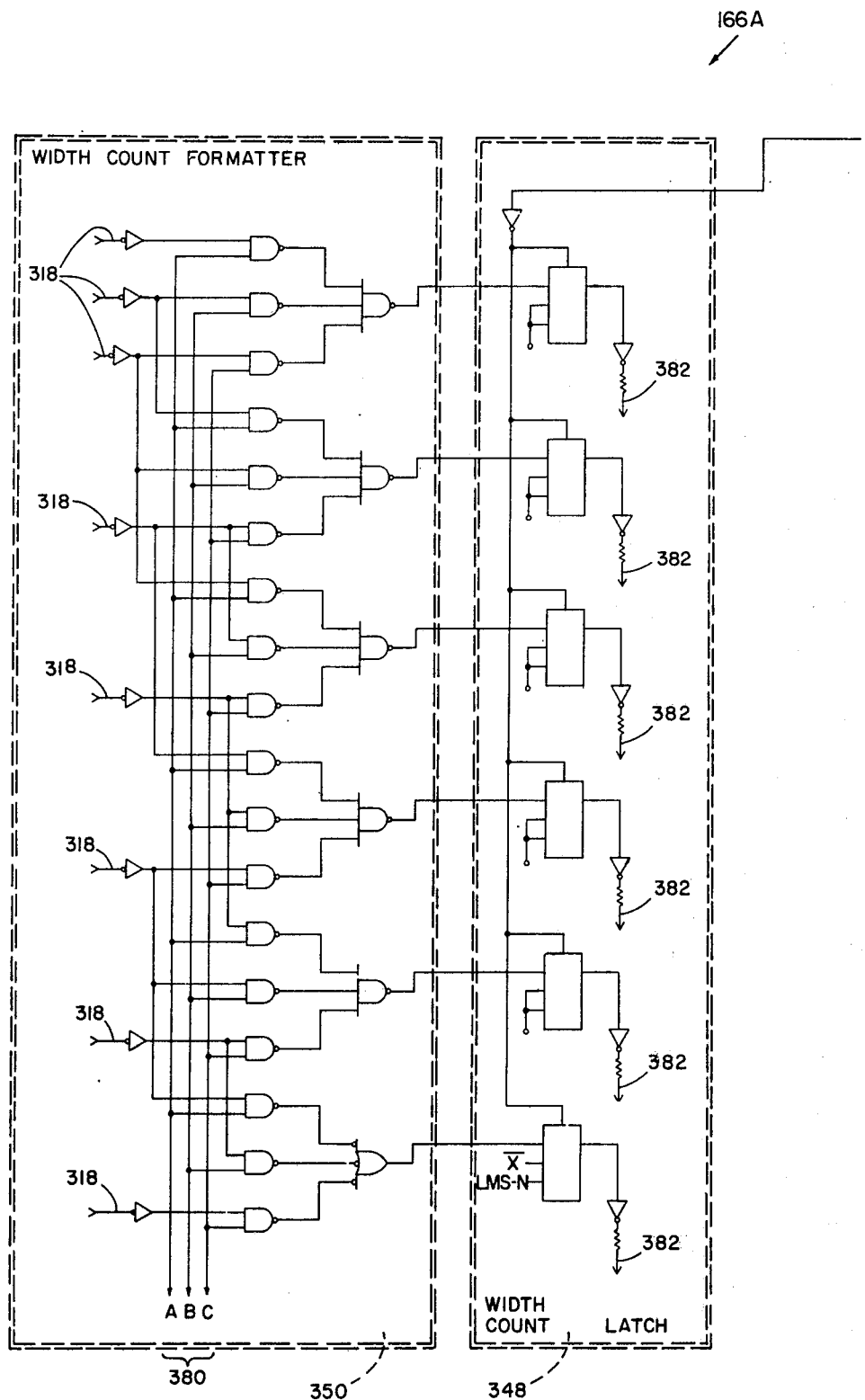
Figure 11B:
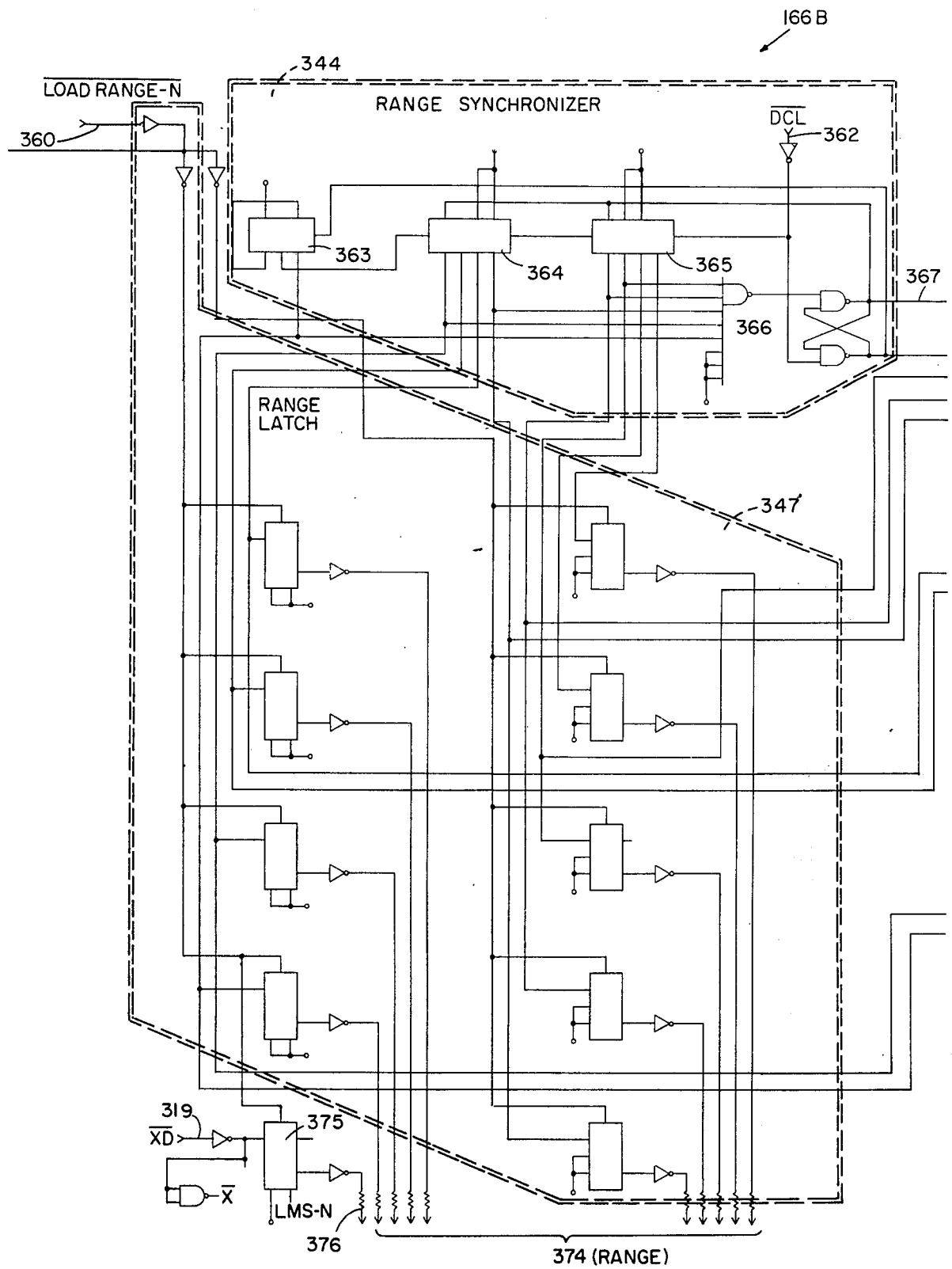
Figure 11C:
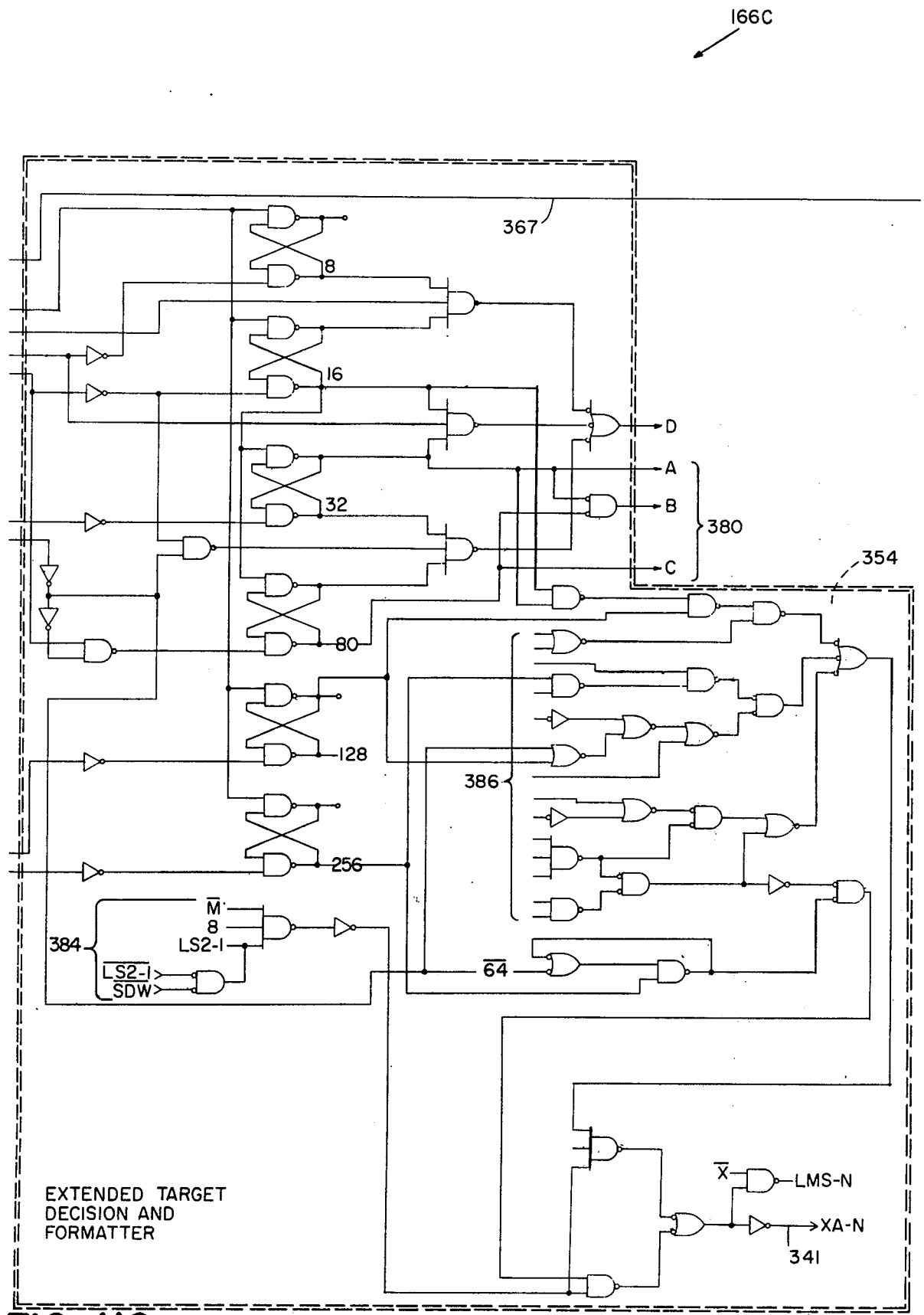
Figure 11D:
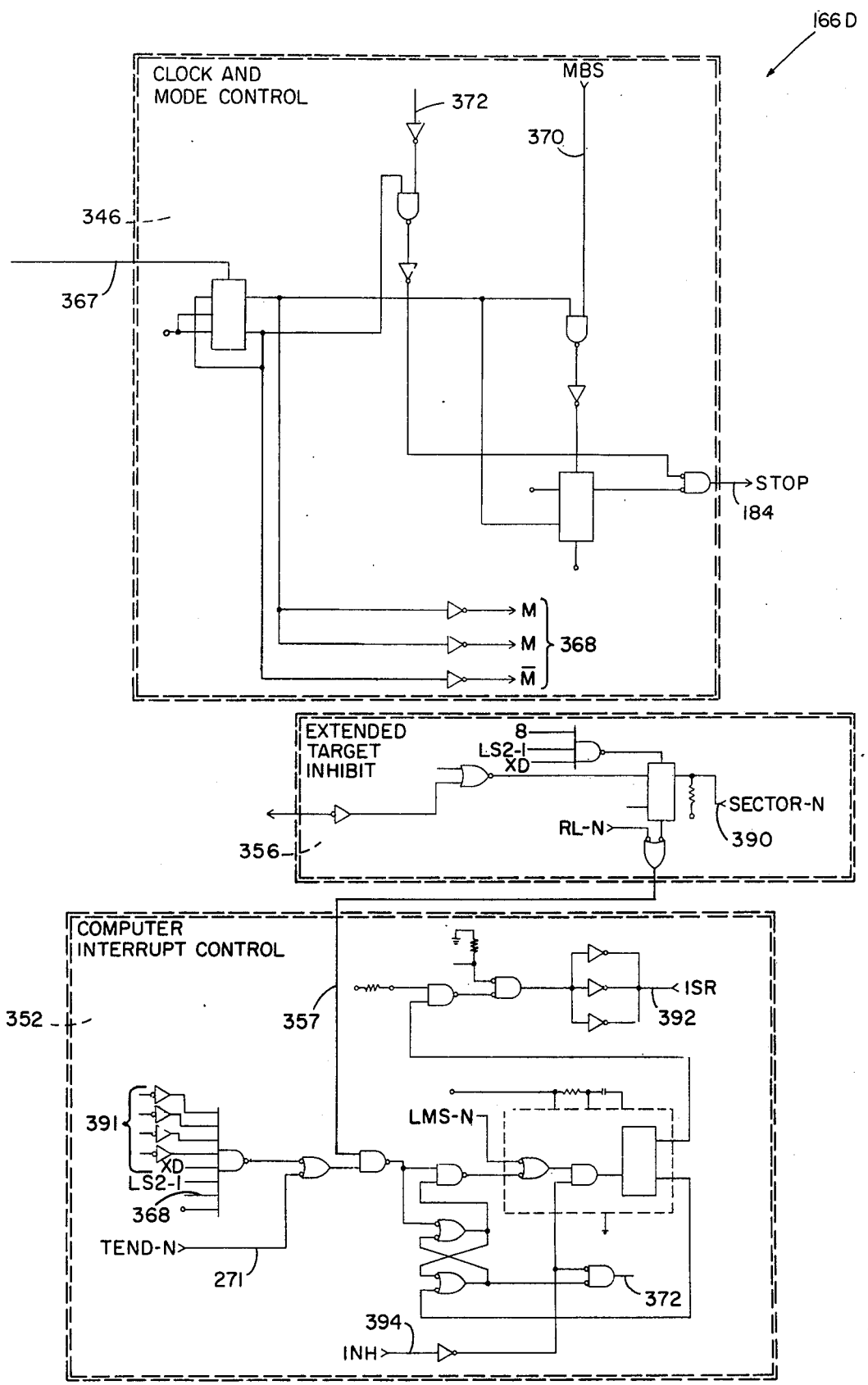
Figure 12:
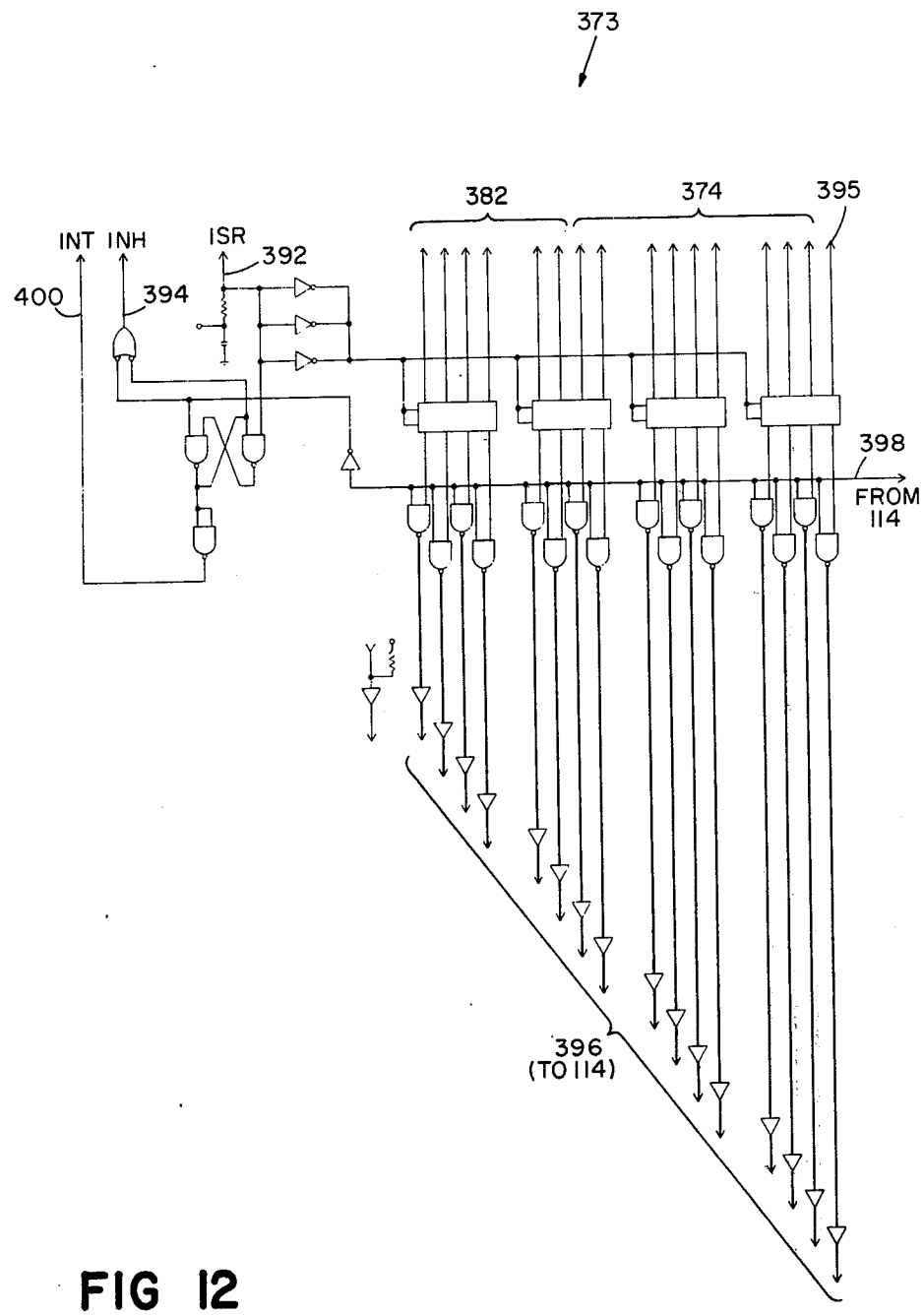
FIG. 12 is a schematic view of an interface portion of the complete system.

Referring now to FIG. 7, Interface Board 156, which is connected to the conventional radar video output to its display, converts the conventional radar trigger pulse and the returning echo pulses to digitized form, for use in the target evaluation apparatus of the invention.

The trigger digitizer block 130 converts a trigger signal input at 214 to a pulse 215 about 1.5 microsec long, delayed by a time that is required by the characteristics of the particular radar being used. This delay is required to synchronize the trigger with the incoming echoes.

The video digitizer 132 includes two resettable integrators 134 and 136, a differential comparator 138, a data output latch 140, a threshold control 142 and a differential error corrector 144. Two differential analog video lines 146 and 148 are input to digitizer 132.

When no echoes are returned from a target, the outputs 146 and 148 are equal. When an echo is returned, the outputs are unequal and the integrators thereof charge to slightly different levels; this condition is detected by differential comparator 138. If the difference is above the threshold, it is output to data output latch 140. After data is loaded into the latch, the integrators are reset by a clock pulse and another cycle begins. Each cycle lasts 0.5 microsec. Quantized video pulses (echoes) are output at 149.

Sector control block 131 is a latch that can control the detection of targets behind landmasses. This latch is controlled by computer 114.

CLOCK

Clock board 158 has seven sections. An eight megahertz precision oscillator 168 provides a stable timing reference for all front end functions. Its output 169 is input to the real time clock generator 170, which counts the 8 megahertz signal down by 27,456 and 109,824 to generate 291.37 hz and 72.84 hz signals 172 and 174. Signals 172 and 174 are used for timing reference in computer 114. Power supply 176 derives a +14.00 volt output 178 from the +19 volt input 180 from supply 150; output 178 is used by the shift registers. Clock control 182 receives a stop signal 184 from Data Buffer Board 166, and ensures that all clocks will stop in the same phase, at the exact end of a range block. Clock control 182 also provides synchronization of all clocks with the eight megahertz clock.

Front end timing generator 186 supplies clock signals to the other front end boards, at outputs 188, 190, 192, 194 196, 198, 200, 202, 204 and 209. These signals are employed to ensure that data is processed at the same rate throughout and therefore remains in order. Outputs 206 and 208 of timing generator 186 are input to the clock driver block 210, which changes the voltage to the proper level to drive the shift registers. Shift register 212, which has 405 bits, is not functionally part of the clock but is located on clock board 158 for convenience.

In addition, each Register board 160 provides four more 405-bit shift registers 212. They are all interchangeable.

LEADING AND TRAILING EDGE SIGNAL MEANS

Digitized radar echoes from output 149 of Interface Board 156 are transferred to Start and End Board 162, where decisions are made determining the beginning and end of a target, and the target's leading and trailing edges are traced after it is initiated. In brief summary of this board, an echo train is read in through Input Selector block 218, from which it circulates through Video 1 Register 220, and then, after the next radar trigger pulse, circulates through the video 2 Register 224, and after the third radar trigger pulse, through Video 3 Register 230, after which it is lost. Three parallel echo trains from three adjacent azimuth sectors are thus in constant circulation and are sampled by the New Target Initiate block 232. When the target present condition (three one's adjacent in azimuth at a single range) is met, a New Target Initiate signal is generated which causes a part of the S-bit control block 246 to generate an S-bit at that range. This S-bit is then propagated at that range as further echo trains are received with positive returns at that range; it may be moved forward in range up to two steps at a time or backward any number of steps in order to place it at the range corresponding to the closest continuous leading edge of the target. If in a particular azimuth sector two S-bits have been propagated and continuous one's are detected between the corresponding ranges, the S-bit at the greater range is destroyed, in order to propagate only the S-bit corresponding to the leading edge.

In response to the generation of an S-bit, an E-bit is generated by E-bit Control block 266. The E-bit is generated at the range of the target box beyond the last echo pulse detected at that azimuth, and may be propagated as further echo trains are received. It may be moved forward or backward in range to trace out the back edge of the target.

If, at the range of an established target, no positive echo is returned from a radar pulse, the S-bit will nevertheless be propagated at that range, under the control of the Main Bang Glue block 268. An E-bit will be propagated in the next range ring. If, after a second radar pulse, no echo is returned from that range, block 268 enables the Target End Control block 270, which puts out a Target End signal at 271, in response to which data is read out to computer 114 for display.

In more detail, radar 110 transmits a timing trigger, which is input at 214 to Trigger Digitizer block 130 on Interface Board 156, where it is converted to a digital timing pulse MB (215) called the main bang. Each main bang is the start of a two-part cycle lasting a minimum of 412 microsec. The first part of this cycle is the Read-In mode, lasting 206 microsec; the second part is the Read-Out mode, lasting normally 206 microsec, but in some cases lasting longer, as when some data must be held for transmission to the computer and processing must be delayed temporarily.

Following a particular transmitted radar pulse, for example pulse A, during Read-In mode of cycle A digitized echo train A is input at 216 to Input Selector block 218, and then to 8-bit Video 1 Register 220 at one of inputs 222. From register 220, echo train A is read into a 405-bit shift register on one of register boards 160. During Read-Out mode, this train A is read back through input 226 to Video 1 Register 220 and a 405-bit shift register.

Following the next radar pulse (pulse B), in Read-In mode, echo train A is read out from the 405-bit shift register, enters input selector 218 at 226, is read through 8-bit Video 2 Register 224, and is read back into a 405-bit shift register. At the same time, new echo train B from pulse B is input at 216 and is read through Video 1 Register 220 to a 405-bit shift register. The two echo trains A and B are kept parallel in range as they circulate. During Read-Out mode of cycle B, train A circles through Video 2 Register 224 to a 405-bit shift register.

During the third cycle C, following radar pulse C, new echo train C is input at 216 and circles through Video 1 Register 220, while train B circles through video 2 Register 224 and train A is input at 228 to selector 218 and then is read through 2-bit Video 3 Register 230, after which it is lost. Trains A, B and C are kept parallel in range throughout.

During Read-In mode of cycle C, the first bits of registers 220, 224 and 230 (containing digitized returns, either 0 or 1, from adjacent azimuth sectors at a single range) are constantly sampled by New Target Initiate block 232. If three adjacent pulses (one's) are detected, a signal on line 234, unless inhibited at 235 by the propagation of a previously generated S-bit at that range, sets target pulse latch 236. Latch 236 is reset by a clock pulse at 238.

Output 240 of target pulse latch 236 provides a New Target pulse at 242, which goes to Width Count Board 164, where the target width count is initialized to one, and the Extended Target (X) bit is set to 0 in Register 243. Output 240 of target pulse latch 236 also goes on line 244 to S-bit Control block 246 and on lline 241 to S-bit control block 247; signal on line 248 is output on lines 250 and 252 to the Data Buffer Board 166 and the Width Count Board 164 and enables the preset at Shift Register 254.

If an echo is returned at a range at which a target has already been detected during previous cycles and has not ended, an S-bit will enter the Start and End Board at 249, parallel with the video from that range, from a shift register, and will inhibit the New Target Initiate block on line 235. Thus, although three adjacent echoes have been received at that range, they will be recognized as part of an existing target. The S-bit will then be propagated through the remainder of the S-Control blocks 246 and 247, in which the S-bit is shifted backward or forward in range.

When the two S-bits are seen by S-bit control to have continuous positive echoes from all ranges between them, the further S-bit is destroyed at 264 and a "compare" signal is output at 255 to Width Count Board 164. The result of this will be described later.

The S-bit is output to a shift register and to the Width Count Board 164 at 325.

During Read-Out mode an S-bit is input to E-bit Control block 266 at 288. This S-bit is Or'd with the output 240 of New Target latch 236 to set the target flip-flop 273, whose output inhibits the New Target Initiate block at 235 as previously described. The current echo train is input on 272 to gate 269 in E-bit Control; gate 269 is enabled by flip-flop 274, which is set and reset by signals from Target End Control 270. When the first hole is seen in the echo train, gate 269 enables the preset on register 277. Mode signals input at 278 and 279 determine shift of the E-bit; during Read-In mode, the E-bit cannot be shifted in range past a hole in the echo train; during Read-Out mode, it can be shifted. In the remainder of E-bit Control block 266, the video train and the S-bits are examined to determine whether the E-bit should be shifted in range to follow the back edge of the target. The E-bit is output from the control block 266 at 282 to a shift register. The E-bit is input from the shift register to Target End Control Block 270 at 275 (ED).

As an example of the generation and propagation of S- and E-bits and their shifts in range under the control of Blocks 246, 247 and 266, refer again to FIG. 5. In this figure, unprimed S-bits show the position after the Read-In part of the cycle, while primed S-bits show the position after Read-Out, if the position has changed. The S-bit originally generated at the twelfth range ring in the eighth azimuth sector is propagated to the ninth sector when an echo is returned at the same range. The E-bit is similarly propagated at the 13th range ring. At the tenth azimuth sector, the S-bit is propagated (S1); however, since positive echoes are also returned from the eleventh and tenth range rings, S-control blocks 246 and 247 will move S1 forward two steps during Read-In mode and two more steps during Read-Out (S1') to the eighth range ring. At the same time, a new S-bit (S2) is generated at the ninth range ring, after three contiguous one's have been detected at that range. This S2 will be stepped forward to the seventh range ring (S2'), which in fact is the leading edge of the target, as seen in FIG. 5.

At the eleventh azimuth sector, the back S-bit (S1') is destroyed and a compare signal is generated. As a result, the width count in Width Count board 164 corresponding to the twelfth range ring is kept, but is recorded at the seventh range ring, corresponding to the leading edge of the target.

The S- and E-bits are propagated through the thirteenth azimuth sector. In the fourteenth sector, during Read-In mode, an E-bit is placed in the eighth range ring, but it is destroyed during Read-Out mode. The E-bit at the back edge of the target is stepped forward to the twelfth range ring. The S- and E-bits trace the edges of the target, while the width count is constantly incremented, up to the seventeenth azimuth sector, at which time no echo is returned at the target range. In this case, as previously explained, the Main Bang Glue block 268 permits the S-bit and E-bit to be propagated despite the lack of radar return. In the eighteenth sector, the S-bit is stepped back one box to the tenth range ring, and its coincidence with the E-bit, together with two consecutive non-returns, causes the End of Target signal to be output at 271, as described.

TARGET WIDTH COUNT

The Width Count Board 164 has the general function of incrementing the count in response to an S-bit, thereby keeping a running total that represents the extension in azimuth of the target. In addition, a compare decision is made here (between two target counts) when there are two S-bits in one train of echoes.

This board has four parallel storage levels 306, 307, 308 and 309, a Level Control block 310, an Output Buffer 312, a Count Control Block 314, and a Compare Control Block 316.

An S-bit from Output 299 of the Start and End Board 162 is input at 300 together with clock signals at 302. Width Count data, for the range of the S-bit, is input at 304, from a shift register 212. The data loaded at 304 is simultaneously input to Data Buffer Board 166 through outputs 318; the data is available for output to computer 114 from Data Buffer Board 166. The Extended Target Bit is loaded at terminal 320. A New Target Pulse 242 from Start and End Board 162 initializes the width count to 1, and clears all other width count bits; it also clears the Extended Target (X) bit. The X-bit may be set by an input at 341 from Data Buffer Board 166. A clock pulse at 322 from the continuously running clock automatically loads data from Level 1 (306) to Level 2 (307). However, loading from Level 2 into the next levels is not automatic; if a Target Flag is set corresponding to target data in Levels 3 and 4 and is detected by Level Control Block 310, no data is loaded from Level 2. The Target Flag appears in the Target Flag shift register block 342.

The count is incremented in Level 4 (309) only when an S-bit is set (input to Count Control Block 314 at 324, ultimately from 325 on the Start and End Board 162), when the processor is in Read-Out mode (input at 326 to Control block 314 from Mode Control Block 346 on Data Buffer Board 166) and when a clock pulse is input at 328. The incremented width count data is then output to a shift register at 330, at the same time that the S-bit leaves Start and End board 162 at 325.

The compare operation is initiated in response to a Compare signal at 255 from the Start and End Board, output when an S-bit is destroyed. The data in Level 3 is compared with the data in Level 4. If one of the targets represented is extended (X bit set), the data from that level is kept and the other discarded. If neither target or both are extended, the data representing the higher width count is kept.

DATA BUFFER AND DISCRIMINATING MEANS

The Data Buffer Board 166 has eight functional sections: a Range Synchronizer 344, a Clock and Mode Control 346, a Range Latch 347, a Count Latch 348, a Width Count Formatter 350, a Computer Interrupt Control 352, an Extended Target Decision block 354, and an Extended Target Data Inhibitor 356.

Range Synchronizer 344 receives a clock pulse at 362; counters 363, 364, and 365 count 0.5 microsec pulses up to 412 (206 microsec, or half a cycle). The data path through the front end is 412 bits long, and Synchronizer 344 provides a count equal to the number of range boxes from which echoes are processed. The 412th pulse sets latch 366. Output 367 of latch 366 is input to Clock and Mode Control 346, whose outputs 368 change state every 412 pulses, to determine the Read-In or Read-Out mode. Outputs 368 are input to Start and End Board at the Input Selector block 218, at 326 to Count Control block 314 on Width Count Board 164, and at 278 and 279 in E-bit control block 266 on Start and End Board 162.

Clock and Mode Control 346 further puts out a stop pulse at 184, at the end of Read-Out mode and when required by a computer busy signal 372 from Computer Interrupt Control 352 this stop pulse stops the front end clocks. The clocks are restarted by a main bang pulse at 370.

Width count data is input to Formatter 350 at terminals 318, from Width Count Board 164. When a circulating S-bit reenters the Start and End Board at 249 from a shift register, a signal is output at 299 to Width Count Board 164. A signal (load range) is then output at 360 on the Width Count Board and is input to Range Latch 347. The load range signal causes loading of Width Count Latch 348 from inputs 318. At the same time it causes loading of the range count to Range Latch 347 from Range Synchronizer 344. The range count is output at 374 to the Con board, which holds data for the computer. The Extended Target bit (XD) (if already set) is loaded from the Width Count board 164 at 319 and output at 376 to the Con board.

Extended Target Decision block 354 discriminates between landmass targets and smaller targets. It provides a set of latches 378 which are set successively, as labeled, at counts 8, 16, 32, 80, 128 and 256. The three signals 380 are functions of range, and are input to Width Count Formatter 350 to act as a switch, determining which bits of the width count data are input to the Width Count Latch 348. For far targets, the highest-order bits are not likely to be needed, while for closer targets, the lowest-order bits are not significant. Thus 8 bits are input at 318 but only 6 bits are loaded into Width Count Latch 348 and output at 382 to the Con board, and thence to computer 114.

An S-bit (from Start and End board 162), a Read-In mode signal (from Mode Control 346) and a signal representing a range greater than eight range boxes (from latches 378) are all required before a target is considered as a possible landmass in block 354; these signals are input at 384. Width count data from latch 348 is input, together with range data, at 386 to a logic tree, whose function is in effect to compare the width count with a test number, representing a predetermined actual length in azimuth. If the width count exceeds this test number, the target is considered to be a landmass, and the output 341 is input to the Width Count Board, where it sets the Extended Target latch.

However, the test number varies with range. This is because, referring to FIG. 2, if the closest target 400 is at a range R1, while the farthest target 402 is at a greater range range R2, and both targets are in absolute terms the same length, the width count for the closer target will be greater than that of the farther target. The width count is thus essentially an angular measurement rather than a linear one. Therefore, to determine whether a particular target is a landmass, its width count must be compared with a number whose value varies inversely with range.

Extended Target Inhibit block 356 normally prevents the Computer Interrupt Control block 352 (at 357) from outputting data for targets behind a landmass. However, this function can be defeated, if desired, by appropriate inputs, including the signal "Sector-N" (390) from Sector Control block 131 on Interface Board 156. The acquisition of targets behind a target identified as a landmass might be desirable under some circumstances; for example, if a bridge is identified as a landmass, no targets will normally be seen beyond it.

Computer Interrupt Control 352 sends a signal to computer 114 directing it to read data from the front end in three cases: when a target ends, an extended target decision is made, or an extended target has a width count divisible by 16. The Target End signal from Start and End Board 162 is input to block 352 at 271; four bits of width count and the XD bit are input at 391. The ISR signal output at 392 determines the loading of data from the Data Buffer Board on the Con Board 373.

INTERFACE WITH COMPUTER

The Con (for Conglomerate) Board 373 is an interface with computer 114, and receives data from the front end for transmission to the computer. The target width is loaded at 382 (6 bits); the range at 374 (9 bits), and the extended target code at 376. This data is output to computer 114 at 396 in response to a signal from the computer on line 398. The "INT" signal 400 is the computer interrupt signal. The INH signal from the Con Board at 394 prevents the further loading of data from the front end while the computer is busy. This signal is cleared by the computer signal on line 398.

COMPUTER AND DISPLAY

Data representing target width, range and extended target code is input from Con Board 373 to Computer 114. Any suitable computer may be used to process the data derived by target evaluation apparatus 112. In the embodiment shown and described, the computer is a MAC Multi-Application Computer, made by Lockheed Electronics Company and described in their publication "MAC Computer Reference Manual", TM 13010009800, published in November 1970 (fifth edition).

This computer includes a read-only memory 408, core memory 410 and a central processing unit 412. Read-only memory 408 provides a number of programs, each having a different priority level, and all under the control of a "program interrupt control"

414. The programs are executed on demand, in response to interrupt signals (as from Interrupt Control block 352 on Data Buffer Board 166). Program interrupt control 414 automatically switches programs in response to these interrupts. A program with low priority is interrupted for the execution of a program with higher priority; when this has been completed, the lower-priority program is resumed at the point of interruption.

Figure 13:
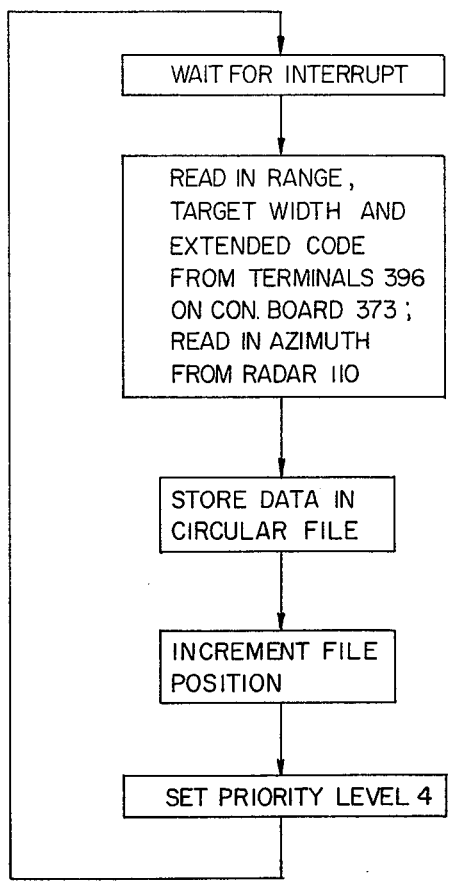
FIGS. 13 through 15 are flow charts of programs executed by the computer in processing the target and landmass output signals for display.
Figure 14:
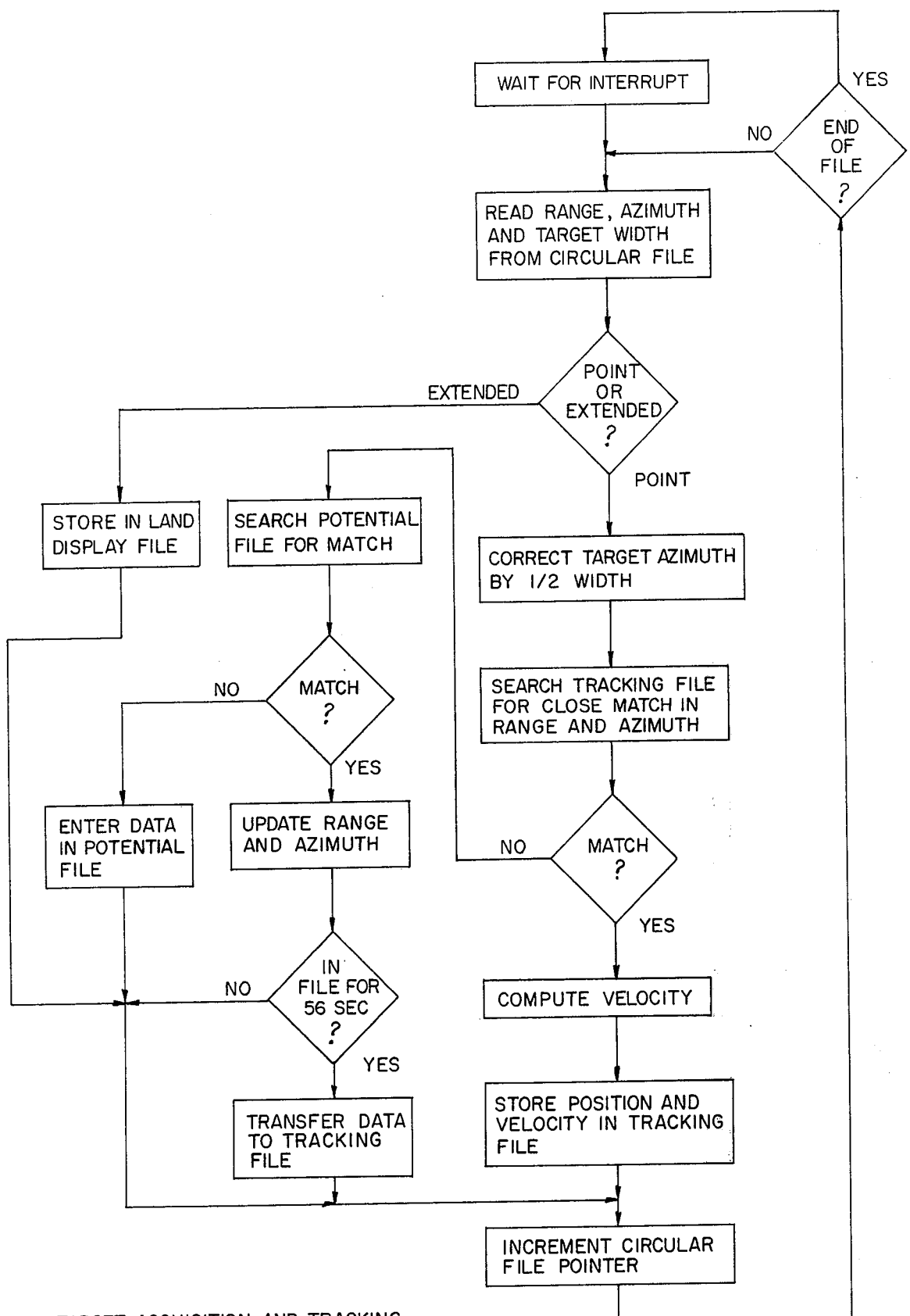

Referring now to FIGS. 13 through 16, flow charts are shown for four programs of different priority, which together transfer the target data from target evaluation apparatus 112 to display 116. (Other stored programs, not directly concerned with this transfer, are not discussed.) The highest priority (level 9) belongs to the program to read in target data from the target evaluation apparatus (FIG. 13). This program is initiated in response to an interrupt signal 400 (INT) from Interrupt block 352 on Data Buffer Board 166. When the interrupt signal is received, the program causes the read-in memory 410 of range, target width and extended code data from terminals 396 on Con Board 373, and azimuth data from radar transmitter 110. The data is temporarily stored in a "circular file" in memory, and the file position is incremented for the next target.

The program for target acquisition and tracking (FIG. 14) has priority level 4. Execution of this program causes the range, azimuth and target width to be read out from the circular file, where it was input from the Con board 373. Extended targets are stored in the land display file in memory 410. Point targets, after correction to place the origin of the vector at the center of the width count, are compared with data in the tracking file in memory 410 to attempt to find data for the same target from previous radar scans. When a match is found, the velocity is computed and stored (with position) in the tracking file. When no match is found in the tracking file, the potential file is searched; if a match is found, the range and azimuth are updated, and if the target has been in the potential file for 56 seconds, it is transferred to the tracking file. If no match is found in the potential file, the new target is entered there. The computer waits at the "wait for interrupt" step when all targets have been read out from the circular file.

Data is transferred from the tracking file to the display file by a program having priority level 0 (lowest level).

Figure 15:
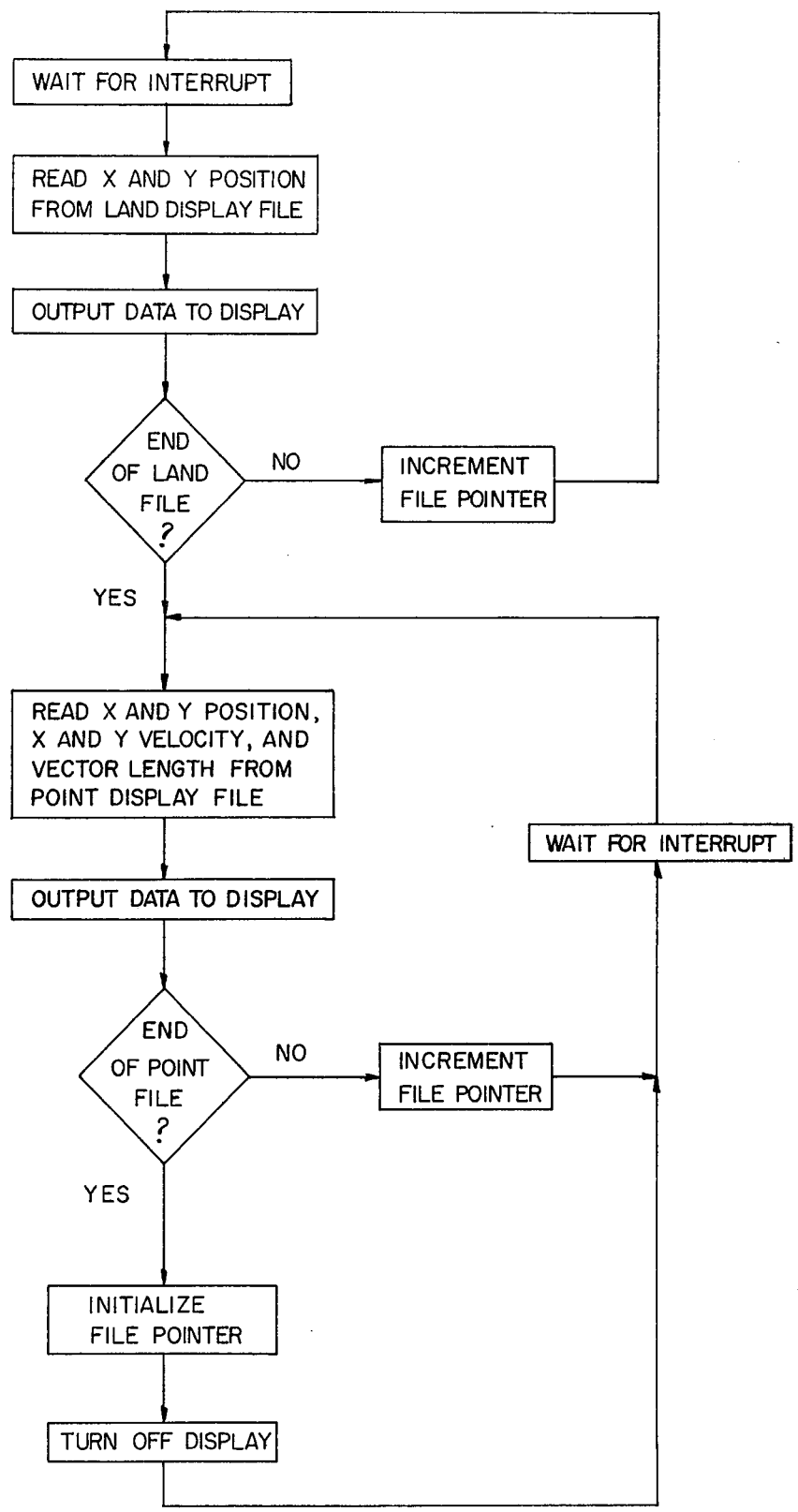
Figure 16:
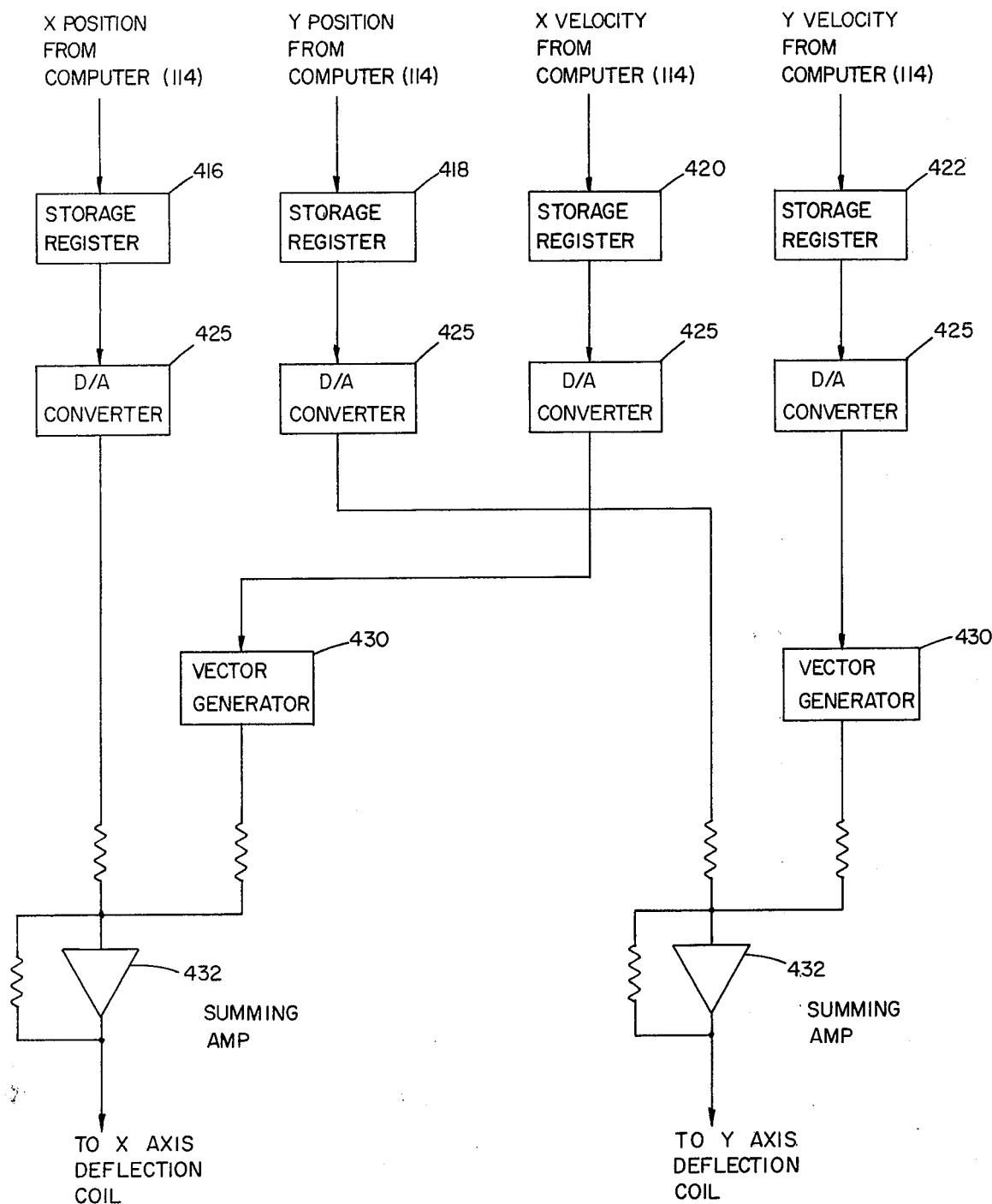
FIG. 16 is a schematic view of portions of the display means.

Referring now to FIG. 15, the program to read out data from the display and tracking files in computer memory 410 has priority level 6, and is executed automatically 60 times per second. Data is read from the land display file first, containing positions of targets identified as extended by target evaulation apparatus 112, and this dats is read into display hardward 117 (without velocity data).

When the entire land file has been read out, the target tracking file is read out, including velocities and vector length. Everything in the entire display file is displayed every 60th of a second. The speed of the computer readout is designed so that the entire file is read out in less than 1/60th of second. The computer then leaves priority level 6 to process programs having lower priority levels (if any require processing) until a clock pulse indicates that 1/60th of a second has elapsed. The file is then displayed again.

Display hardware 117 (FIG. 16) provides storage registers 416, 418, 420 and 422, into which are read the X position, Y position X velocity and Y velocity respectively from computer 114. Digital data from each storage register is input to a digital-to-analog converter 425. The X position and X velocity together determine the signal input to the X axis deflection coil, and the Y axis deflection coil similarly receives a signal determined by the Y position and Y velocity.

SUMMARY

Figure 3:
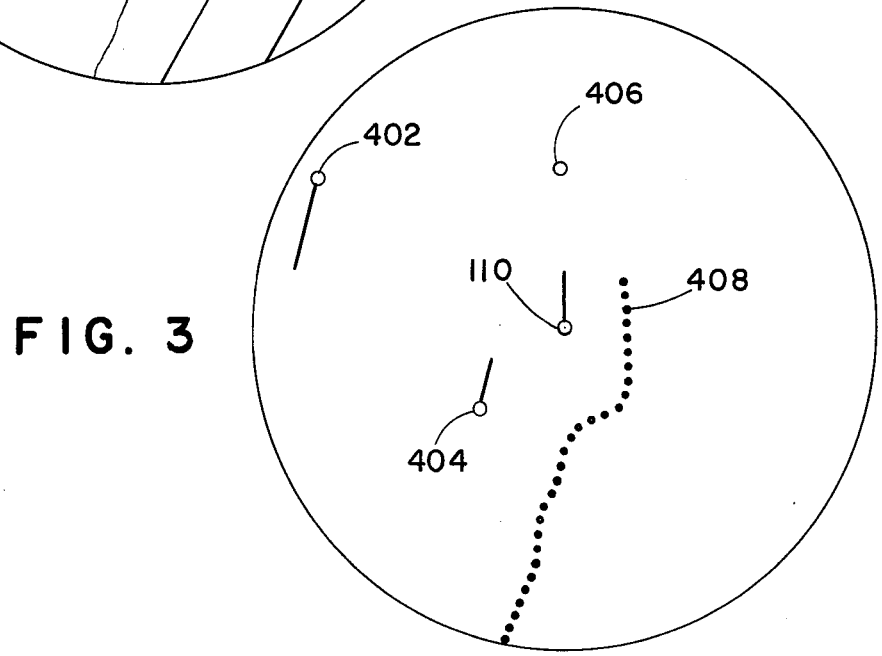
FIG. 3 is an illustrative view of the display corresponding to the features of FIG. 2.

In summary, referring now again to FIGS. 2 and 3, ships 402 and 404 and buoy 406 reflect radar pulses from radar 110, as does the landmass 407. Ship 405, beyond the landmass may also reflect pulses but ordinarily will not be displayed; under special circumstances, if desired, it may be displayed in response to a command input to the control board.

On each radar scan, ships 404 and 402, buoy 406 and landmass 407 return echoes to radar 110; these echoes are digitized and sampled for a Target Present condition. For each target, an S-bit and E-bit are generated and propagated to trace the leading and trailing edges of the target envelope until the S-bit and E-bit coincide, after two non-returns, to signal the end of the envelope. A width count of the target is kept. At the end of ship targets 402 and 404, and of buoy 406, the width count is less than a predetermined actual length somewhat greater than the largest known ship at the range of the target; each of these targets is therefore determined to be a point, not a landmass. Target width and range data are therefore read into the pont target display file in computer 114 and are correlated with previous data for calculation of velocity. The two ship targets are displayed as open circles with velocity vectors attached; buoy 406 has no vector.

Echoes returning from landmass 407 are marked with S- and E-bits, which are propagated until the width count exceeds the predetermined actual length at the range of the leading edge. At this time the landmass leading edge position is output as an extended target to computer 114, where it is stored in the landmass display file; after every 16th radar pulse thereafter, a point representing the leading edge is displayed as a small dot, as at 408, without a vector.

What is claimed is:

1. Target evaluation apparatus for use with marine surface radar processing equipment providing digitized target range pulses at a plurality of ranges
    said target evaluation apparatus comprising
    target leading edge signal means providing a target leading edge signal pulse at each of successive azimuths
    target trailing edge signal means providing a target trailing edge signal pulse at each of successive azimuths and initially separated in range from said target leading edge signal pulse
    the coincidence in range of a leading edge signal pulse and a trailing edge signal pulse providing a target envelope end recognition signal and
    discriminating means responsive to a maximum number of said target leading edge signal pulses, said maximum number decreasing at successively increasing ranges, for discriminating between landmass targets of greater than a predetermined actual length in azimuth representing a maximum ship length and possible ship targets of less than said predetermined length, providing a discriminated targer output signal responsive to said possible ship targets.

2. Target evaluation apparatus as claimed in claim 1 wherein said discriminating means provides a landmass output signal responsive to targets of greater than said predetermined length representing a major portion of the leading edge in azimuth of landmass targets.

3. Target evaluation apparatus for use with marine surface radar processing equipment providing target range pulses at a plurality of ranges and digitized to have one of two values,
    said target evaluation apparatus comprising
    target leading edge signal means responsive to the first value of said digitized target range pulses providing a target leading edge signal pulse,
    target trailing edge signal means responsive to the second value of said digitized target pulses providing a target trailing edge signal pulse at the same azimuth and initially separated in range from said target leading edge signal pulse,
    azimuth propagation means for propagating said edge signals at successive azimuth intervals to define a target envelope,
    range stepping means for altering the range position of a said propagated edge signal responsive to the range positions of said digitized target range pulses to define a target envelope range,
    target end recognition means responsive to a predetermined number of target range pulses having said second value at successive azimuth intervals and at said target envelope range and to the coincidence in range of a leading edge signal pulse and a trailing edge signal pulse for providing a target end recognition signal, and
    discriminating means responsive to the propagation of a said leading edge signal pulse through a maximum number of azimuth intervals, said maximum number decreasing at successively increasing target envelope ranges, for discriminating between landmass targets of greater than a predetermined actual length in azimuth representing a maximum ship length and possible ship targets of less than said predetermined length, providing a discriminated target output signal responsive to said possible ship targets.

4. Target evaluation apparatus for use with marine surface radar processing equipment providing digitized target range pulses at a plurality of ranges,
    said target evaluation apparatus comprising
    target leading edge signal means providing a target leading edge signal pulse at successive azimuths, and
    target trailing edge signal means providing a target trailing edge signal pulse at successive azimuths and initially separated in range from said target leading edge signal pulse,
    the coincidence in range of a leading edge signal pulse and a trailing edge signal pulse providing a target envelope end recognition signal.

5. Target evaluation apparatus as claimed in claim 4, further including
    means for altering the range position of a said edge signal responsive to the range position of said digitized target range pulses.

6. Target evaluation apparatus for use with marine surface radar processing equipment providing digitized target range signal pulses at a plurality of ranges said apparatus comprising
    discriminating means responsive to said signal pulses for discriminating against at least a major portion of landmass targets of greater than a predetermined length in azimuth while providing output signals responsive to targets of less than said predetermined length representing possible ship targets,
    said discriminating means being responsive to a maximum number of successive azimuthal target pulses, said maximum number decreasing at successively increasing ranges, for discriminating against landmass targets of greater than a predetermined actual length in azimuth representing maximum ship length.

7. Apparatus as claimed in claim 6, wherein
    said discriminating means
    provides discriminated output signals selectively responsive
    to targets of less than said predetermined length representing possible ship targets and
    to targets of greater than said predetermined length representing a major portion of the leading edge in azimuth of landmass targets.

8. Marine surface radar processing equipment for use with marine surface radar providing target range pulses at a plurality of ranges to provide digitized target range pulses at one of two values, comprising
    target evaluation apparatus including
    target leading edge signal means responsive to the first value of said digitized target range pulses providing a target leading edge signal pulse,
    target trailing edge signal means responsive to the second value of said digitized target range pulses providing a target trailing edge signal pulse at the same azimuth and initially separated in range from said target leading edge signal pulse,
    azimuth propagation means for propagating said edge signals at successive azimuth intervals to define a target envelope,
    range stepping means for altering the range position of a said propagated edge signal responsive to the range positions of said digitized target range pulses to define a target envelope range, and
    target end recognition means responsive to a predetermined number of target range pulses having said second value at successive azimuth intervals and at said target envelope range and to the coincidence in range of a leading edge signal pulse and a trailing edge signal pulse for providing a target end recognition signal.

9. Equipment as claimed in claim 8 further including
    discriminating means responsive to the propagation of a said leading edge signal pulse through a maximum number of azimuth intervals, said maximum number decreasing at successively increasing target envelope ranges, for discriminating between landmass targets of greater than a predetermined actual length in azimuth representing a maximum ship length and possible ship targets of less than said predetermined length, providing a discriminated target output signal responsive to said possible ship targets.

10. Equipment as claimed in claim 9 wherein said discriminating means also provides a discriminated landmass output signal responsive to said landmass targets.

* * * * *